US007079211B2

(12) United States Patent
Kim et al.

(10) Patent No.: US 7,079,211 B2
(45) Date of Patent: *Jul. 18, 2006

(54) MULTI-DOMAIN LIQUID CRYSTAL DISPLAY COMPROMISING FIELD INDUCTION WINDOWS HAVING PATTERNS DIFFERENT FROM EACH OTHER IN AT LEAST TWO OF THE PIXEL REGIONS

(75) Inventors: Kyeong Jin Kim, Puchon-shi (KR); Do Hee Kwon, Koyang-shi (KR); Seong Moh Seo, Inchon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/805,482

(22) Filed: Mar. 22, 2004

(65) Prior Publication Data
US 2005/0007529 A1      Jan. 13, 2005

Related U.S. Application Data

(63) Continuation of application No. 09/567,134, filed on May 8, 2000, now Pat. No. 6,757,040.

(30) Foreign Application Priority Data
May 7, 1999    (KR) ................................ 1999-16382

(51) Int. Cl.
*G02F 1/1337*  (2006.01)
(52) U.S. Cl. ...................... 349/129; 349/191; 349/123; 349/143
(58) Field of Classification Search ................ 349/129, 349/139, 123, 143, 191, 187
See application file for complete search history.

(56) References Cited

U.S. PATENT DOCUMENTS

| 4,581,608 A | 4/1986 | Aftergut et al. ............. 340/704 |
| 4,728,175 A | 3/1988 | Baron ........................ 350/336 |
| 4,937,566 A | 6/1990 | Clerc ......................... 340/784 |
| 4,978,203 A | 12/1990 | Yamazaki et al. ....... 350/339 R |
| 5,249,070 A | 9/1993 | Takano ........................ 359/54 |
| 5,574,582 A | 11/1996 | Takeda et al. ................ 359/59 |
| 5,623,354 A | 4/1997 | Lien et al. .................. 349/124 |

(Continued)

FOREIGN PATENT DOCUMENTS

EP        0 752 611        1/1997

(Continued)

OTHER PUBLICATIONS

U.S. Appl. No. 09/250,262, filed Feb. 1999, Kim et al.

(Continued)

*Primary Examiner*—Andrew Schechter
*Assistant Examiner*—Thoi V. Duong
(74) *Attorney, Agent, or Firm*—McKenna Long & Aldridge LLP

(57) ABSTRACT

Multi-domain liquid crystal display including a first substrates and a second substrate, a liquid crystal layer between the first and second substrates, a plurality of gatelines and datalines on the first substrate crossed each other at fixed intervals, a pixel electrode in each of pixel regions formed between the gatelines and the datalines, a supplementary electrode around each of the pixel electrodes in the same layer with the pixel electrodes, at least one field induction window in each of the pixel regions, and an optical orientation film formed at least one of the first and second substrates.

9 Claims, 24 Drawing Sheets

U.S. PATENT DOCUMENTS

| | | | | |
|---|---|---|---|---|
| 5,668,650 | A | | 9/1997 | Mori et al. .................... 349/42 |
| 5,737,051 | A | | 4/1998 | Kondo et al. ................ 349/141 |
| 5,777,701 | A | | 7/1998 | Zhang ......................... 349/44 |
| 6,100,953 | A | * | 8/2000 | Kim et al. ................... 349/129 |
| 6,285,431 | B1 | * | 9/2001 | Lyu et al. .................... 349/143 |
| 6,335,776 | B1 | * | 1/2002 | Kim et al. ................... 349/129 |

FOREIGN PATENT DOCUMENTS

| | | |
|---|---|---|
| EP | 0 814 142 | 12/1997 |
| EP | 0 854 377 | 7/1998 |
| EP | 0 884 626 | 12/1998 |
| GB | 2 296 810 | 7/1996 |
| GB | 2 321 718 | 8/1998 |
| GB | 2 337 843 | 1/1999 |
| JP | 05-297412 | 11/1993 |
| JP | 09-197420 | 7/1997 |
| JP | 09-230387 | 9/1997 |
| WO | 961 0774 | 4/1996 |

OTHER PUBLICATIONS

U.S. Appl. No. 09/357,247, filed Jul. 1999, Lee.
U.S. Appl. No. 09/537,570, filed Mar. 2000, Kim et al.
U.S. Appl. No. 09/256,180, filed Feb. 1999, Seo et al.
U.S. Appl. No. 09/326,415, filed Jan. 1999, Kim et al.
U.S. Appl. No. 09/421,114, filed Oct. 1999, Kim et al.
U.S. Appl. No. 09/448,276, filed Nov. 1999, Lee et al.
U.S. Appl. No. 09/497,507, filed Feb. 2000, Lee et al.
U.S. Appl. No. 09/327,283, filed Jan. 1999, Yoo et al.
U.S. Appl. No. 09/598,213, filed Jun. 2000, Kim et al.
U.S. Appl. No. 09/541,426, filed Apr. 2000, Kim et al.
U.S. Appl. No. 09/567,134, filed May 2000, Kim et al.
U.S. Appl. No. 09/618,165, filed Jul. 2000, Choi et al.
U.S. Appl. No. 09/629,793, filed Jul. 2000, Lee et al.
A. Lien, R.A. John, Two-Domain TN-LCDs Fabricated by Parallel Fringe Field Method, SID Digest, 1993, pp. 269-272.
A. Lien, R.A. John, TFT-Addressed Two-Domain TN VGA Displays Fabricated Using the Parallel Fringe Field Method, SID Digest, 1994, pp. 594-597.
N. Koma, Y. Baba, K. Matsuoka, No-Rub Multi-Domain TFT-LCD Using Surrounding-Electrode Method, SID Digest, 1995, pp. 869-872.
H. Murai, M. Suzuki, S. Kaneko, Novel High Contrast Random and Controlled 4-Domain CTN-LCDs with Wide Viewing Angle, Euro Display '96, pp. 159-161.
Y. Koike, S. Kataoka, T. Sasaki, H. Chida, H. Tsuda, A. Takeda and K. Ohmuro, T. Sasabayashi, K. Okamoto, A Vertically Aligned LCD Providing Super-High Image Quality, IDW '97, pp. 159-162.
N. Koma, R. Nishikawa, Development of a High-Quality TFT-LCD for Projection Displays, SID Digest, 1997, pp. 461-464.
K. Ohmuro, S. Kataoka, T. Sasaki, Y. Koike, Development of Super-High Image Quality Vertical Alignment Mode LCD, SID Digest, 1997, pp. 845-848.

* cited by examiner

MULTI-DOMAIN LIQUID CRYSTAL DISPLAY COMPROMISING FIELD INDUCTION WINDOWS HAVING PATTERNS DIFFERENT FROM EACH OTHER IN AT LEAST TWO OF THE PIXEL REGIONS

This application is a continuation of U.S. patent application Ser. No. 09/567,134 filed May 8, 2000 now U.S. Pat. No. 6,757,040.

BACKGROUND OF THE INVENTION

1. Field of the Invention

The present invention relates to a liquid crystal display, and more particularly, to a multi-domain liquid crystal display, in which a supplementary electrode is formed around a pixel region at the same layer as a pixel electrode, and a field induction window is formed in the pixel region, for deforming the field.

2. Background of the Related Art

Recently, the multi-domain liquid crystal display has been suggested, in which the liquid crystal is driven by means of a supplementary electrode electrically insulated from the pixel electrode without orienting the liquid crystal, which will be explained, with reference to the attached drawing. FIG. 1 illustrates a section of a related art unit pixel of a liquid crystal display.

Referring to FIG. 1, the related art liquid crystal display is provided with a first substrate, a second substrate, and a liquid crystal layer between the first and the second substrates. On the first substrate, there are a plurality of datalines and gatelines crossed each other to form a plurality of pixel regions, a TFT (Thin Film Transistor)(not shown) having a gate electrode, a gate insulating film, a semiconductor layer and source/drain electrodes in each pixel region on the first substrate, a protection film 37 having a contact hole to the drain electrode formed on an entire surface of the first substrate, a pixel electrode 13 in the pixel region on the protection film 37 in contact with the drain electrode through the contact hole, and a supplementary electrode 15 formed between the gate insulating film and the protection film 37 having a portion overlapped with the pixel electrode 13. And, on the second substrate, there is a light shielding layer 25 for shielding a light leaking from the gatelines, the datalines, and the TFTs, a color filter layer 23 formed on the light shielding layer 25, a common electrode 17 formed on the color filter layer 23, and the liquid crystal layer formed between the first substrate and the second substrate. The supplementary electrode 15 formed around the pixel electrode 13 and the open region 19 of the common electrode 17 distort a field provided to the liquid crystal layer, resulting to drive liquid molecules in the unit pixel in variously. This means that a dielectric energy from the distorted field orients directors of the liquid crystal to a desired direction when a voltage is applied to the liquid crystal display.

However, the related art liquid crystal display has the following problems.

First, the formation of the open regions in the common electrodes for obtaining a multi-domain effect in the related art liquid crystal display leads to require an open region patterning additionally in the fabrication of the liquid crystal display.

Second, if no open region is formed, or the open region has a small width, the director of the liquid crystal takes relatively much time until the director comes to a stabilization because there is less field distortion required for division of the domains.

SUMMARY OF THE INVENTION

Accordingly, the present invention is directed to a multi-domain liquid crystal display that substantially obviates one or more of the problems due to limitations and disadvantages of the related art.

An object of the present invention is to provide a multi-domain liquid crystal display which has a simple fabrication process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the multi-domain liquid crystal display including a first substrate and a second substrate, a liquid crystal layer between the first and second substrates, a plurality of gatelines and datalines on the first substrate crossed each other at fixed intervals, a pixel electrode in each of pixel regions formed between the gatelines and the datalines, a supplementary electrode around each of the pixel electrodes at the same layer with the pixel electrodes, at least one field induction window in each of the pixel regions, and an optical orientation film formed at least one of the first and second substrates, wherein the field induction windows formed in at least two of the pixel regions have patterns different from one another.

The multi-domain liquid crystal display further includes an L-lined thin film transistor formed close to a crossing point of each of the gatelines and the datalines, a gate insulating film extended all over the first substrate, a protection film formed on the gate insulating film extended all over the first substrate, a light shielding layer formed on the second substrate, a color filter layer formed on the light shielding layer, and a common electrode formed on the color filter layer.

The multi-domain liquid crystal display further includes a negative uniaxial or biaxial film formed on at least one of the first and second substrates.

The liquid crystal has a positive or negative dielectric anisotropy, and the liquid crystal layer has a chiral dopant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
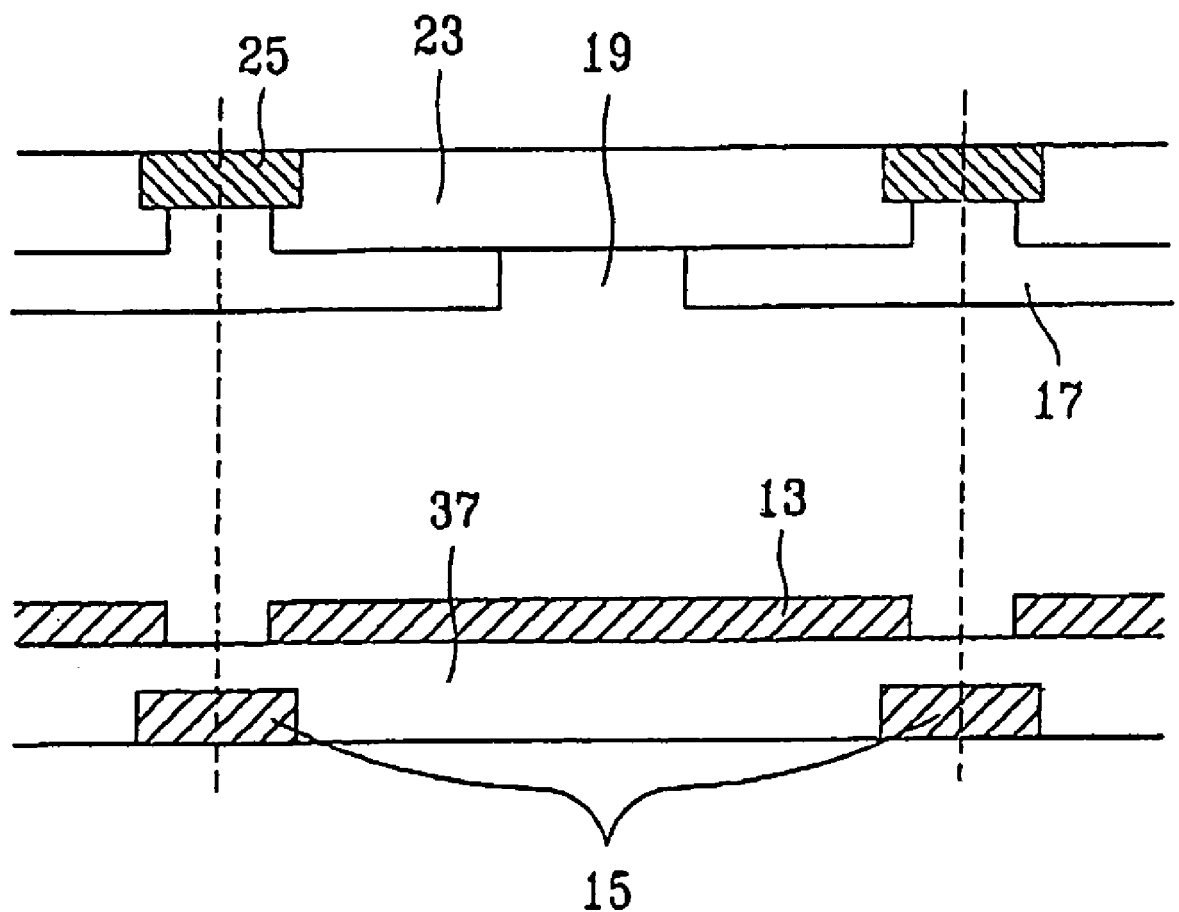
FIG. 1 illustrates a section of a related art liquid crystal display.
Figure 4:
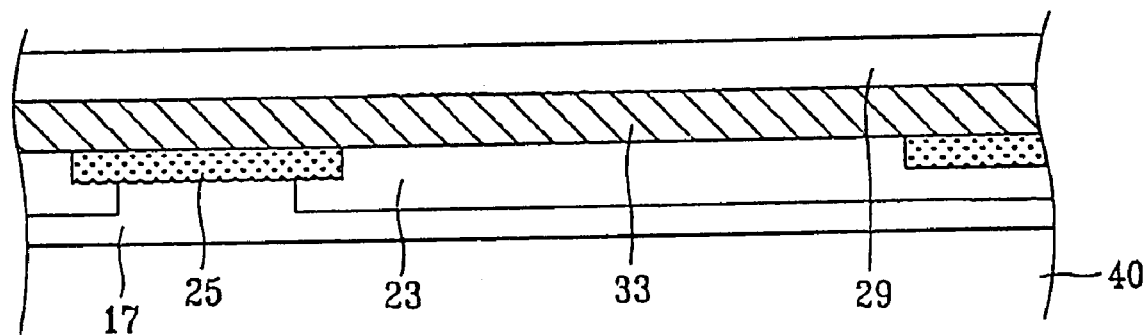
FIG. 4 illustrates a section of a multi-domain liquid crystal display in accordance with a second preferred embodiment of the present invention.
Figure 4:
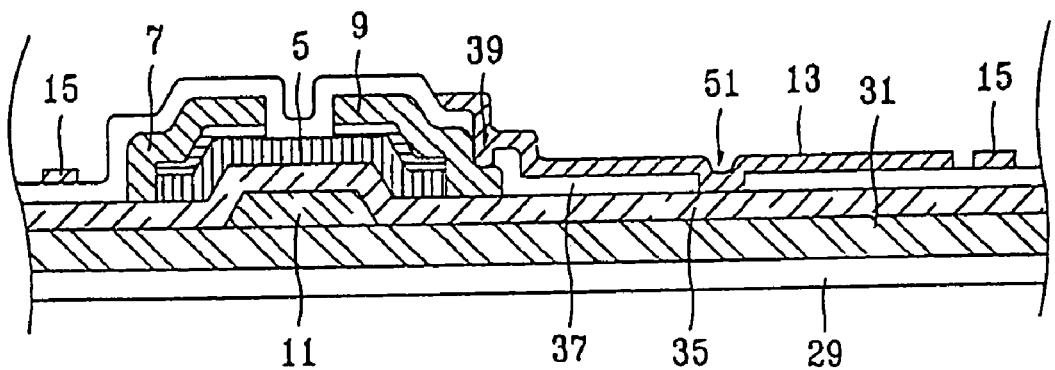
Figure 5:
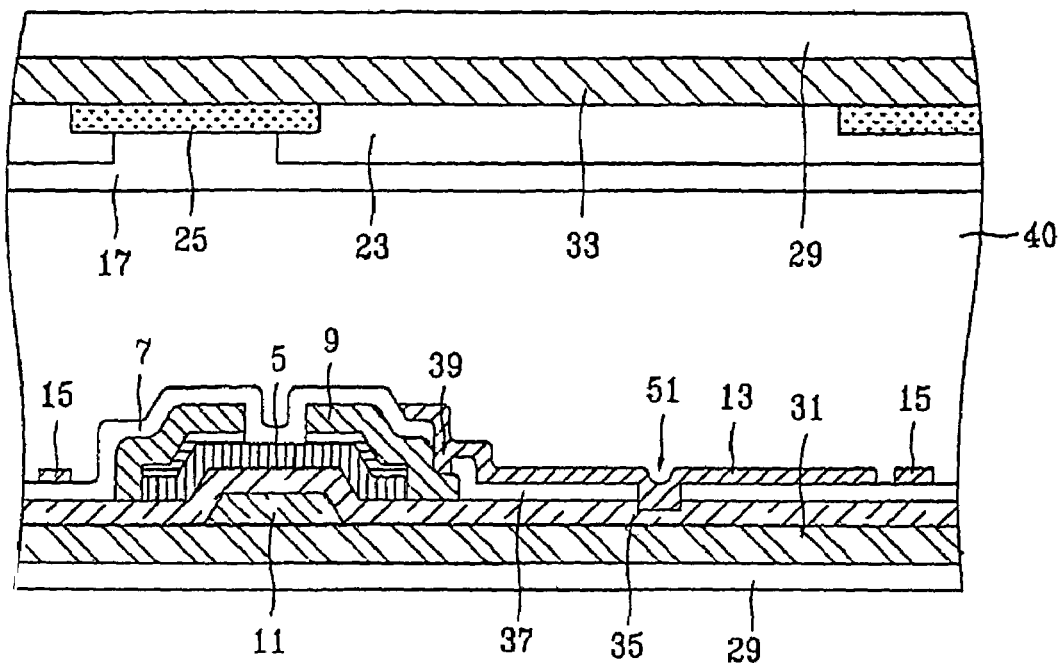
FIG. 5 illustrates a section of a multi-domain liquid crystal display in accordance with a third preferred embodiment of the present invention.
Figure 6:
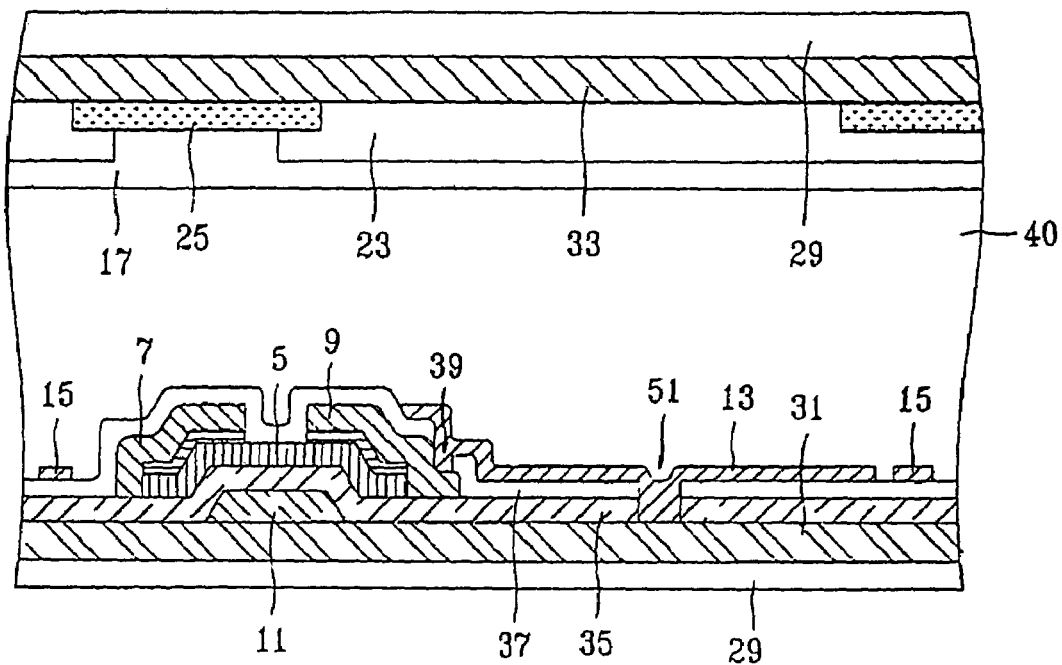
FIG. 6 illustrates a section of a multi-domain liquid crystal display in accordance with a fourth preferred embodiment of the present invention.
Figure 7:
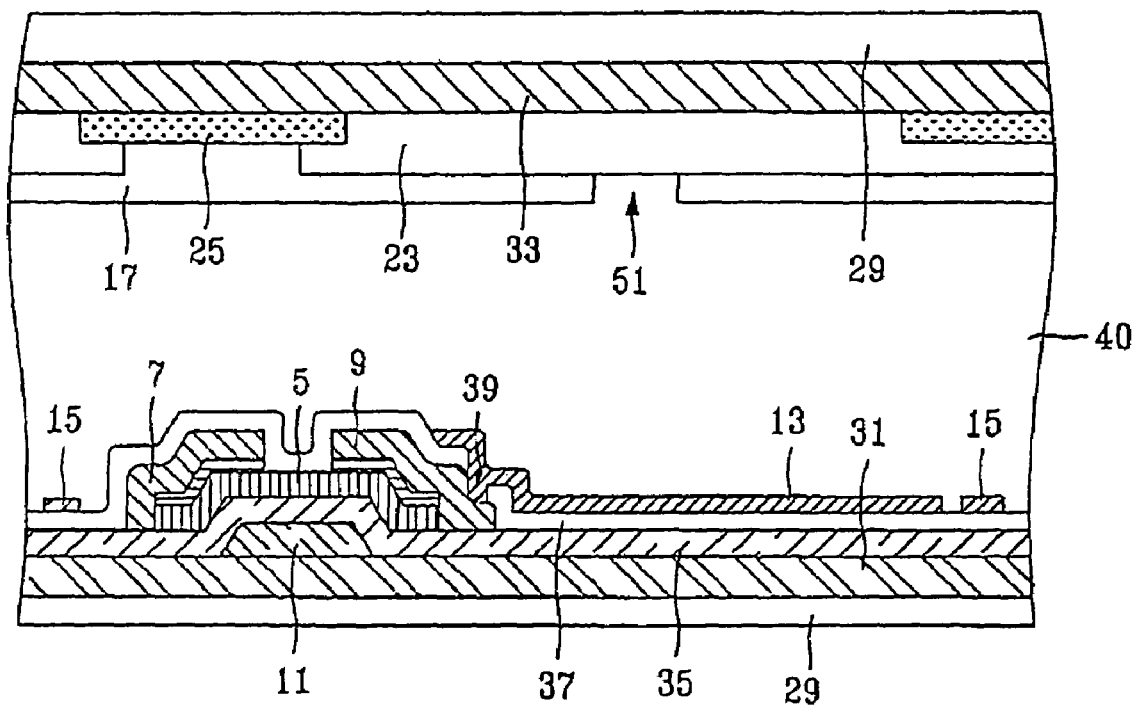
FIG. 7 illustrates a section of a multi-domain liquid crystal display in accordance with a fifth preferred embodiment of the present invention.

Reference will now be made in detail to the preferred embodiments of the present invention, examples of which are illustrated in the accompanying drawings. FIG. 1 illustrates a section of a related art liquid crystal display, FIG. 2 illustrates a plan view of a multi-domain liquid crystal display of the present invention, FIG. 3 illustrates a section of a multi-domain liquid crystal display in accordance with a first preferred embodiment of the present invention, FIG. 4 illustrates a section of a multi-domain liquid crystal display in accordance with a second preferred embodiment of the present invention, FIG. 5 illustrates a section of a multi-domain liquid crystal display in accordance with a third preferred embodiment of the present invention, FIG. 6 illustrates a section of a multi-domain liquid crystal display in accordance with a fourth preferred embodiment of the present invention, and FIG. 7 illustrates a section of a multi-domain liquid crystal display in accordance with a fifth preferred embodiment of the present invention.

Figure 2:
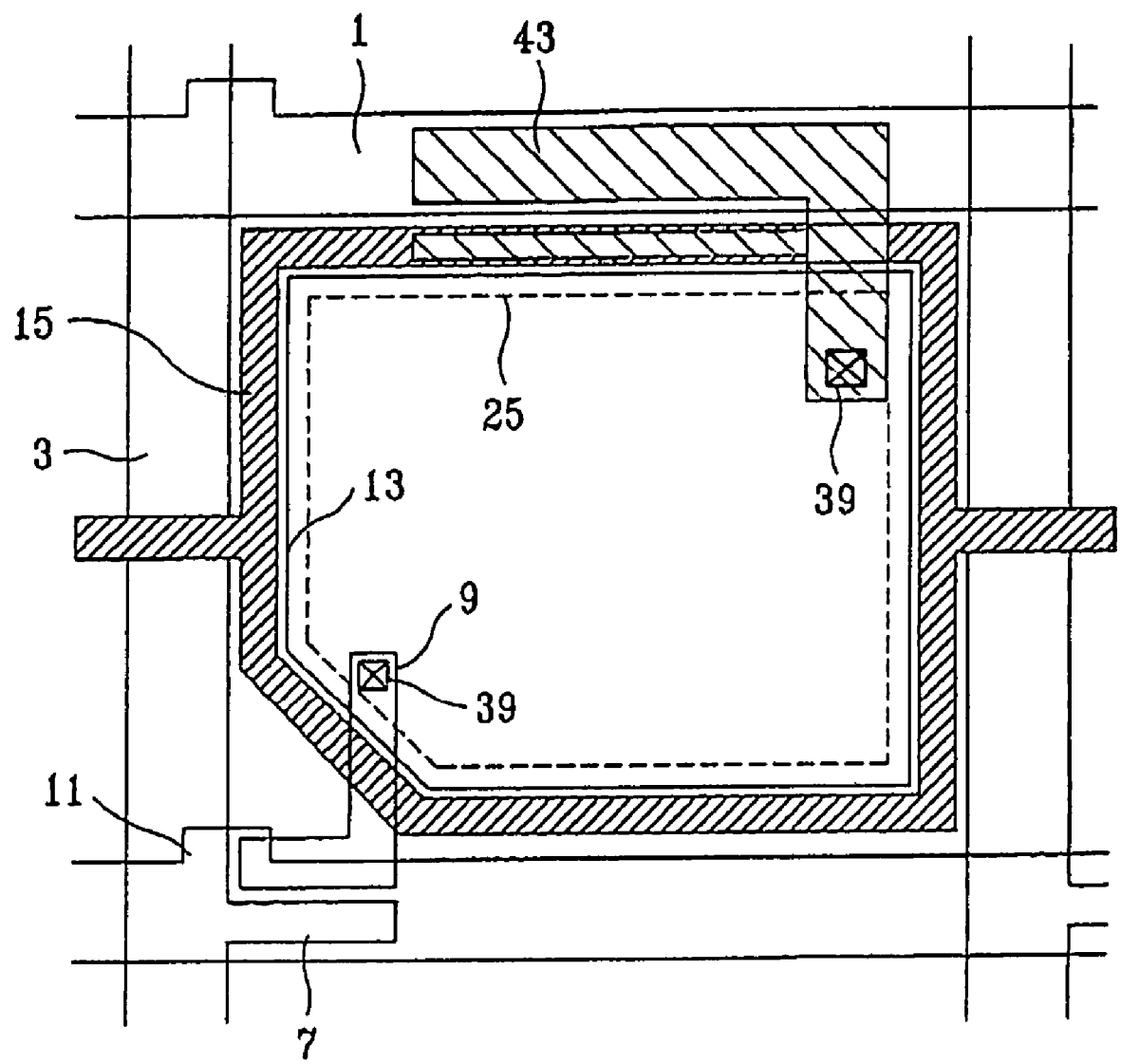
FIG. 2 illustrates a plan view of a multi-domain liquid crystal display of the present invention.
Figure 3:
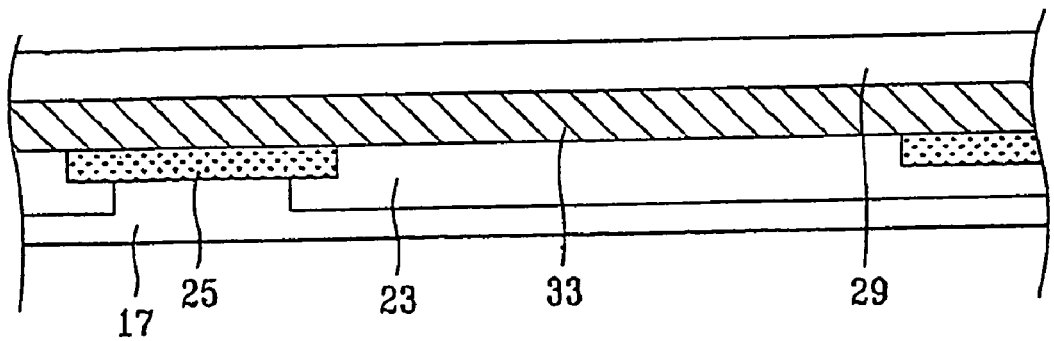
FIG. 3 illustrates a section of a multi-domain liquid crystal display in accordance with a first preferred embodiment of the present invention.
Figure 3:
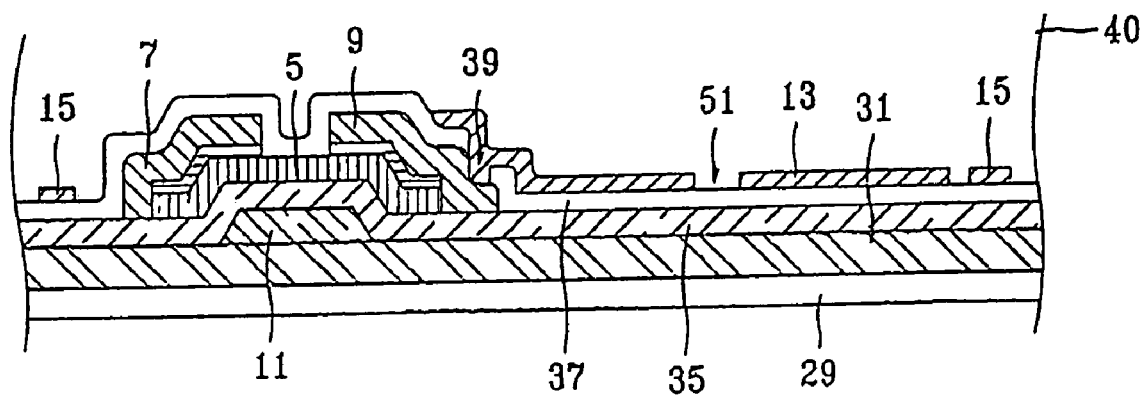

Referring to FIGS. 2 and 3, the multi-domain liquid crystal display in accordance with a first preferred embodiment of the present invention includes a first substrate 31 and a second substrate 33 fitted together with a space therebetween, a plurality of datalines 3 and gatelines 1, both on the first substrate crossed each other to divide the first substrate into a plurality of pixel regions, a thin film transistor formed on the first substrate in each of the pixel regions each having a gate electrode 11, a gate insulating film 35, a semiconductor layer 5, an ohmic contact layer, and source/drain electrodes 7 and 9, a protection film 37 having a contact hole to the drain electrode 9 formed all over the first substrate having the thin film transistors, a pixel electrode 13 formed on the protection film 37 in each of the pixel region excluding the thin film transistor in contact with the drain electrode 9 through the contact hole, and a supplementary electrode 15 formed on a layer the same with the pixel electrode 13 for deforming a field. In this instance, there is a field induction window 51 formed in the pixel electrode 13 for obtaining a field deformation effect. That is, a portion of the pixel electrode 15 is removed form forming the field induction window 51. And, on the second substrate 33, there is a light shielding layer for shielding a light leaking from the gatelines 1, the datalines 3, and the thin film transistors, color filter layers 23 each formed in a region corresponding to each of the pixel regions between the light shielding layers 25, and a common electrode 17 each extended over the color filter layer 23 and the light shielding layer 25. And, there is a liquid crystal layer 40 formed between the first substrate and the second substrate. Alternatively, the field induction window 51 may be formed in a color filter layer or an overcoat layer of the second substrate 33.

A method for fabricating the aforementioned multi-domain liquid crystal display will be explained.

Gatelines 1 each having a gate electrode are formed on the first substrate in one direction at fixed intervals, and a gate insulating film 35 is formed on an entire surface. And, a semiconductor layer 35 and an ohmic contact layer are formed in an active region of each of the thin film transistors, and datalines 3 each having source/drain electrodes 7 and 9 are formed on the gate insulating films 25. And, a protection film 37 is formed on an entire surface 37, and, after a contact hole is formed in each of the drain electrodes 9, the pixel electrodes 13 and the supplementary electrodes 15 are formed. The gate electrode 11 and the gatelines 1 are formed of one or two layers of a metal, such as Al, Mo, Cr, Ta and Al alloy by sputtering and patterning. The gate insulating film 35 is formed of SiNx or SiOx by PECVD (Plasma Enhancement Chemical Vapor Deposition) and patterning. And, the semiconductor layer 5 and the ohmic contact layer is formed of a-Si and n+ a-Si by PECVD and patterning. The gate insulating film 35 and the a-Si and n+ a-Si may be deposited by PECVD in succession to form a gate insulating film, and patterned to form the semiconductor layer and the ohmic contact layer. And, the datalines 3 and the source/drain electrodes 7 and 9 are formed of a metal, such as Al, Mo, Cr, Ta and Al alloy by sputtering and patterning. In formation of the datalines 3, a storage electrode 43 is formed on the same time to be overlapped with the gatelines 1, which storage electrode 43 serves as a storage capacitor with the gatelines 1. Then, a protection film 37 is formed of BCB(BenzoCycloButene), acrylic resin, polyimide compound, SiNx or SiOx on an entire surface of the first substrate 31, and ITO(Indium Tin Oxide), or a metal, such as Al or Cr, are sputtered thereon and patterned, to form a pixel electrode 13, together with a supplementary electrode 15 to surround the pixel electrode. In this instance, the pixel electrode 13 is connected to the drain electrode 9 and the storage electrode 43 through a contact hole 39. And, in order to improve the aperture, the gate insulating film 35 may be formed of BCB, acrylic resin and polyimide compound. If the supplementary electrode 15 is formed of the same material with the pixel electrode 13, the supplementary electrode 15 is formed at the same layer with the pixel electrode 13 by using the same mask, and electrically connected to the common electrode 17, or the supplementary electrode 15 is formed of a metal different from the pixel electrode 13 by using additional mask, or may be formed on a layer different from the pixel electrode 13. And, the pixel electrode 13 or the protection film 37 may be patterned to form a field induction window 51 in a form of slit or hole, or the gate insulating film 35 may be partially or totally patterned, to form the field induction window 51. Then, a light shielding layer 25 is formed on the second substrate 33, and a color filter layer 23 is formed such that R, G, B (Red, Green, and Blue) elements are repeated in every pixels. And, alike the pixel electrode 13, a common electrode 17 of a transparent material, such as ITO, is formed on the color filter layer 23, and, after the first substrate 31 and the second substrate 33 are bonded together, liquid crystal is injected between the first and second substrates 31 and 33, to complete fabrication of a multi-domain liquid crystal display. The liquid crystal is nematic with a negative or positive dielectric anisotropy, and may be added with a chiral dopant.

In the aforementioned multi-domain liquid crystal display of the present invention, Ag-Dotting parts are formed on the first substrate 31 at each corner of driving region of the liquid crystal display and connected to the supplementary electrode 15 on the same time with the formation of the supplementary electrode 15, for applying a voltage Vcom thereto, thereby driving the liquid crystal display by applying a field to the second substrate 33. One coat of polymer is applied on at least one of the first or second substrate 31 or 33, to form a phase shifting film 29. The phase shifting film 29, a negative uniaxial film, is formed of a uniaxial material having only one optical axis, for compensating users vision for a change of viewing angle with respect to a direction vertical to the substrate, that enlarges an area with no gray inversion, and increases a contrast ratio in an oblique direction, and left/right direction viewing angles can be compensated more effectively by forming on pixel in multi-domain. In the multi-domain liquid crystal display of the present invention, other than the negative uniaxial film, the phase shifting film may be a negative biaxial film, of a biaxial material with two optical axes, for obtaining a wider viewing angle than the uniaxial film. After the phase shifting film is formed, a polarizer (not shown) is attached to both substrates. The polarizer may be applied as an integrated unit with the phase shifting film. And, as shown in FIG. 2, the multi-domain liquid crystal display of the present invention has an L-lined thin film transistor structure, which has an L formed TFT on the gateline 1, that can increase an aperture and reduce a parasitic capacitance formed between the gateline 1 and the drain electrode 9. And, the multi-domain liquid crystal display of the present invention has an orientation film (not shown) formed on an entire surface of the first and/or the second substrate. The orientation film may be of an optical orientation film formed of a material selected from compounds of PVCN(polyvinylcinnamate), PSCN (polysiloxanecinnamate), or CelCN(cellulosecinnamate) group, but any material suitable for an optical orientation processing can be applicable. The optical orientation film fixes a pretilt angle and an alignment direction or a pretilt direction of a director of a liquid crystal molecule on the same time by at least one time of light irradiation, that permits to secure orientation stability of the liquid crystal. The light used for the optical orientation is a light of an UV range, and may be a non-polarized light, a linearly polarized light, or partially polarized light. The optical orientation may be applicable to one or both of the substrates, and the orientation processing may differ for the two substrates, or the orientation processing may not be applied while the orientation film is formed. The orientation processing permits to form a multi-domain liquid crystal display with at least two domains in which orientations of the liquid crystal molecules in the liquid crystal layer differ from each other. That is, one pixel is divided into four regions in a form of '+' or '×', or in a length and a width directions, or in diagonal directions, and an orientation processing or an orientation direction in each of the regions or in each of the substrate is made differently, for implementing a multi-domain effect. At least one of the divided regions may be left unoriented, and it is possible to leave all the regions unoriented.

In the meantime, the multi-domain liquid crystal display in accordance with a second preferred embodiment of the present invention is as shown in FIG. 4. That is, the field induction window 51 is formed, not in the pixel electrode as is in the first embodiment, but in the protection film 37 by patterning a portion of the protection film 37. The multi-domain liquid crystal display in accordance with a third preferred embodiment of the present invention is as shown in FIG. 5. That is, the field induction window 51 is formed, not in the pixel electrode as is in the first embodiment, but in the protection film 37 and the gate insulating film 25 by patterning portions of the protection film 37 and the gate insulating film 25. The multi-domain liquid crystal display in accordance with a fourth preferred embodiment of the present invention is as shown in FIG. 6. That is, the field induction window 51 is formed, not in the pixel electrode as is in the first embodiment, but in the protection film 37 and the gate insulating film 25 by patterning portions of the protection film 37 and the gate insulating film 25 to a full depth. The multi-domain liquid crystal display in accordance with a fifth preferred embodiment of the present invention is as shown in FIG. 7. That is, the field induction window 51 is formed, not in the pixel electrode as is in the first embodiment, but in the common electrode 17 on the second substrate 33 by patterning a portion of the common electrode 17. Thus, the field induction window 51 may be formed in different positions as shown in the foregoing embodiments, and directions of the supplementary electrode 15 and the field induction window 51 may be made different, for orienting in different direction in implementation of the multi-domain effect. That is, by patterning width, length, and both diagonal directions, an effect of two divided domains is obtained, or by patterning forms of '×', '+', double Y, and '◊' and '×', and '+' on the same time, effects of four divided domain and multi-domain can be implemented.

Figure 8:
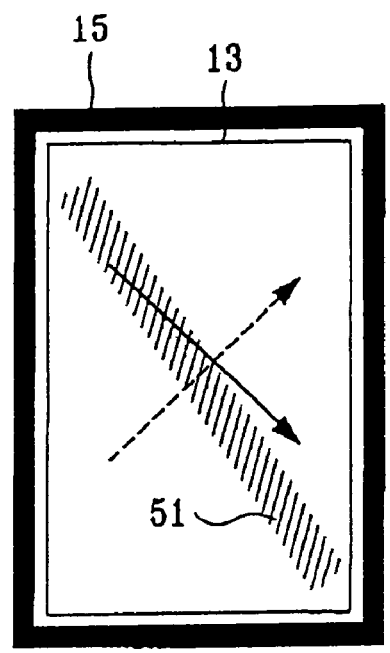
FIG. 8 illustrates a plan view of a multi-domain liquid crystal display in accordance with a sixth preferred embodiment of the present invention.
Figure 9:
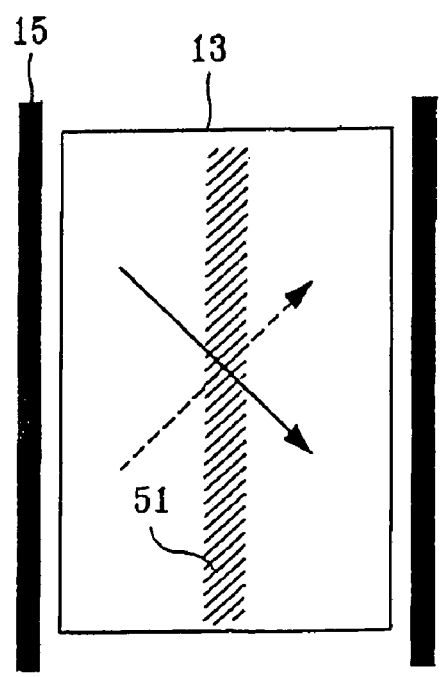
FIG. 9 illustrates a plan view of a multi-domain liquid crystal display in accordance with a seventh preferred embodiment of the present invention.
Figure 10:
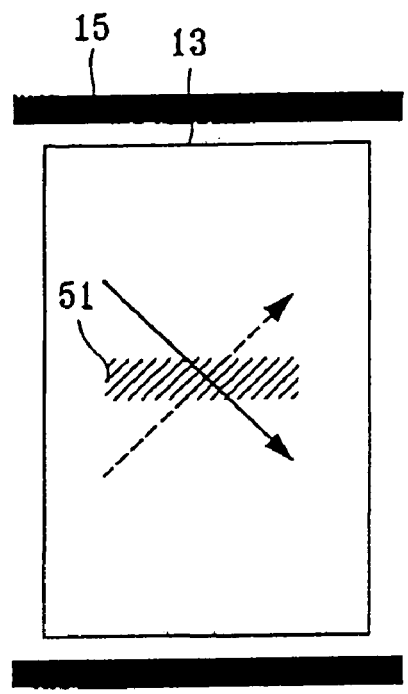
FIG. 10 illustrates a plan view of a multi-domain liquid crystal display in accordance with an eighth preferred embodiment of the present invention.
Figure 11:
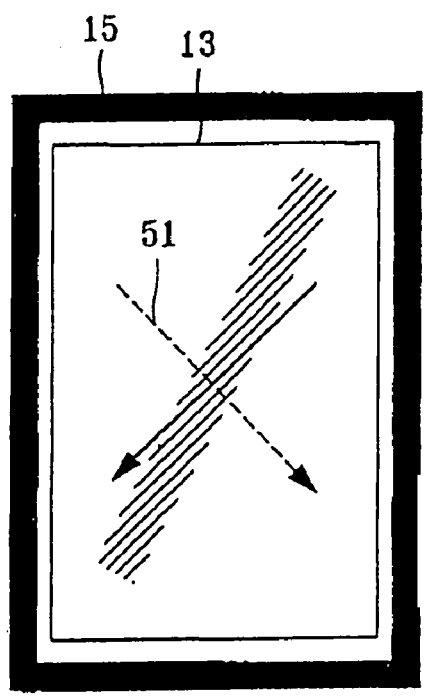
FIG. 11 illustrates a plan view of a multi-domain liquid crystal display in accordance with a ninth preferred embodiment of the present invention.
Figure 12:
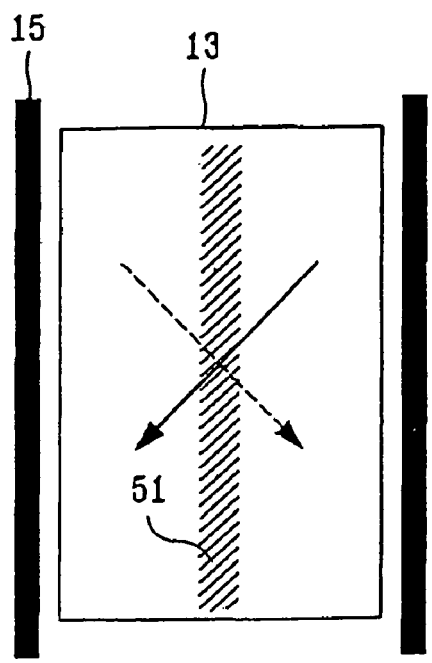
FIG. 12 illustrates a plan view of a multi-domain liquid crystal display in accordance with a tenth preferred embodiment of the present invention.
Figure 13:
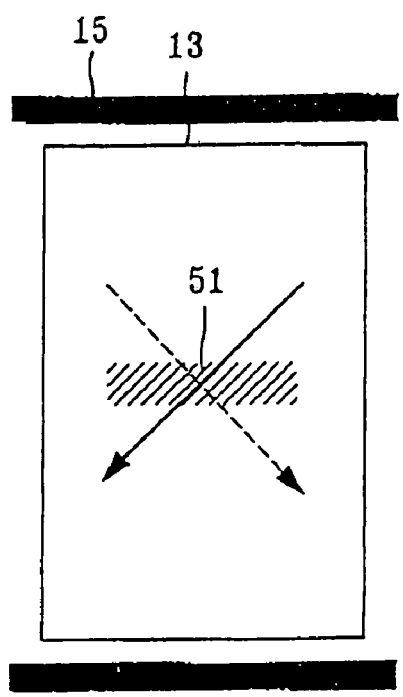
FIG. 13 illustrates a plan view of a multi-domain liquid crystal display in accordance with an eleventh preferred embodiment of the present invention.
Figure 14:
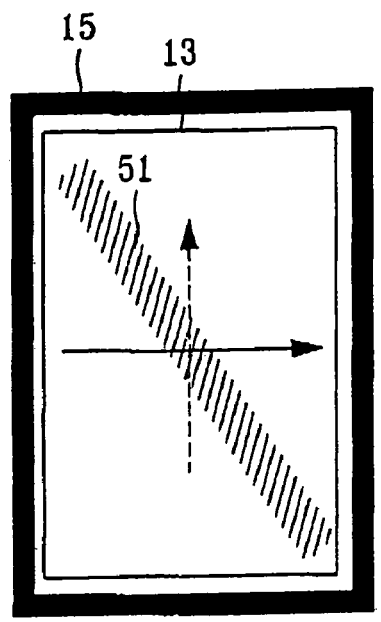
FIG. 14 illustrates a plan view of a multi-domain liquid crystal display in accordance with a twelfth preferred embodiment of the present invention.
Figure 15:
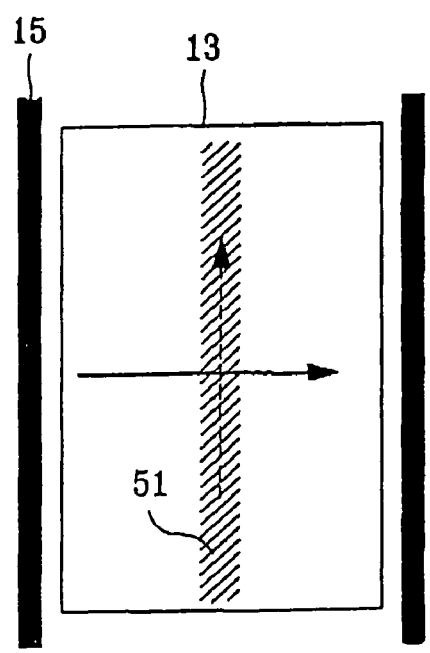
FIG. 15 illustrates a plan view of a multi-domain liquid crystal display in accordance with a thirteenth preferred embodiment of the present invention.
Figure 16:
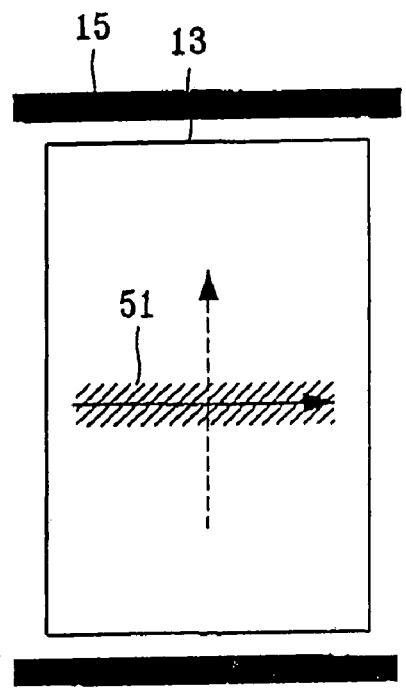
FIG. 16 illustrates a plan view of a multi-domain liquid crystal display in accordance with a fourteenth preferred embodiment of the present invention.
Figure 17:
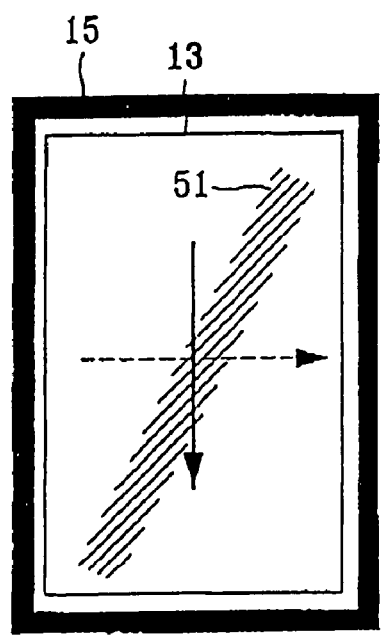
FIG. 17 illustrates a plan view of a multi-domain liquid crystal display in accordance with a fifteenth preferred embodiment of the present invention.
Figure 18:
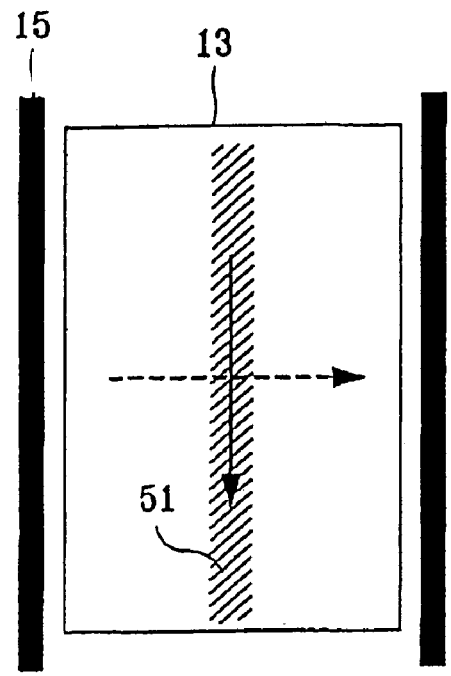
FIG. 18 illustrates a plan view of a multi-domain liquid crystal display in accordance with a sixteenth preferred embodiment of the present invention.
Figure 19:
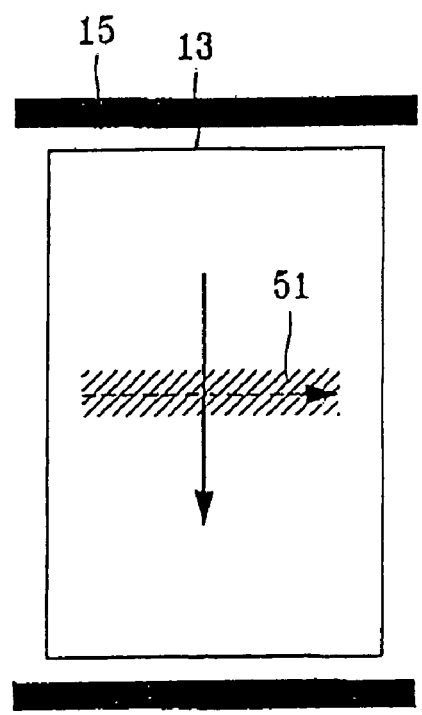
FIG. 19 illustrates a plan view of a multi-domain liquid crystal display in accordance with a seventeenth preferred embodiment of the present invention.

FIG. 8 illustrates a plan view of a multi-domain liquid crystal display in accordance with a sixth preferred embodiment of the present invention, FIG. 9 illustrates a plan view of a multi-domain liquid crystal display in accordance with a seventh preferred embodiment of the present invention, FIG. 10 illustrates a plan view of a multi-domain liquid crystal display in accordance with an eighth preferred embodiment of the present invention, FIG. 11 illustrates a plan view of a multi-domain liquid crystal display in accordance with a ninth preferred embodiment of the present invention, FIG. 12 illustrates a plan view of a multi-domain liquid crystal display in accordance with a tenth preferred embodiment of the present invention, FIG. 13 illustrates a plan view of a multi-domain liquid crystal display in accordance with an eleventh preferred embodiment of the present invention, FIG. 14 illustrates a plan view of a multi-domain liquid crystal display in accordance with a twelfth preferred embodiment of the present invention, FIG. 15 illustrates a plan view of a multi-domain liquid crystal display in accordance with a thirteenth preferred embodiment of the present invention, FIG. 16 illustrates a plan view of a multi-domain liquid crystal display in accordance with a fourteenth preferred embodiment of the present invention, FIG. 17 illustrates a plan view of a multi-domain liquid crystal display in accordance with a fifteenth preferred embodiment of the present invention, FIG. 18 illustrates a plan view of a multi-domain liquid crystal display in accordance with a sixteenth preferred embodiment of the present invention, and FIG. 19 illustrates a plan view of a multi-domain liquid crystal display in accordance with a seventeenth preferred embodiment of the present invention.

The sixth, seventh and eighth embodiments show the field induction window 51 and the supplementary electrode 15 for dividing domain. In the drawings, the solid line denotes an orientation on the upper substrate and the dashed line denotes an orientation on the lower substrate. That is, as shown in FIG. 8, the multi-domain liquid crystal display in accordance with a sixth preferred embodiment of the present invention includes a supplementary electrode 15 formed to surround a pixel electrode 13, a unit pixel, and a field induction window 11 in a diagonal direction, preferably in a direction opposite to an orientation on the upper substrate. And, as shown in FIG. 9, the multi-domain liquid crystal display in accordance with a seventh preferred embodiment of the present invention includes a supplementary electrode 15 formed only on left and right sides of a pixel electrode 13, and a field induction window 51 formed in parallel to the supplementary electrode 15. And, as shown in FIG. 10, the multi-domain liquid crystal display in accordance with an eighth preferred embodiment of the present invention includes a supplementary electrode 15 formed only on upper and lower sides of a pixel electrode 13, and a field induction window 51 formed in parallel to the supplementary electrode 15.

The ninth, tenth, and eleventh embodiments show the field induction window 51 and the supplementary electrode 15 for dividing a domain. It can be noted that orientations on the upper and lower substrates are different in the sixth, seventh and eighth embodiment. That is, as shown in FIG. 11, the multi-domain liquid crystal display in accordance with a ninth preferred embodiment of the present invention includes a supplementary electrode 15 formed to surround a pixel electrode 13, and a field induction window 51 formed in a diagonal direction. And, as shown in FIG. 12, the multi-domain liquid crystal display in accordance with a tenth preferred embodiment of the present invention includes a supplementary electrode 15 formed only on left and right sides of a pixel electrode 13, and a field induction window 51 formed in parallel to the supplementary electrode 15. And, as shown in FIG. 13, the multi-domain liquid crystal display in accordance with an eleventh preferred embodiment of the present invention includes a supplementary electrode 15 formed only on upper and lower sides of a pixel electrode 13, and a field induction window 51 formed in parallel to the supplementary electrode 15.

In the twelfth, thirteenth and fourteenth embodiments, the field induction window 51 and the supplementary electrode 15 are formed so that the liquid crystal is oriented from a bottom to top direction or from left to right direction. That is, as shown in FIG. 14, the multi-domain liquid crystal display in accordance with a twelfth preferred embodiment of the present invention includes a supplementary electrode 15 formed to surround a pixel electrode 13, a unit pixel, and a field induction window 51 formed in a diagonal direction. And, as shown in FIG. 15, the multi-domain liquid crystal display in accordance with a thirteenth preferred embodiment of the present invention includes a supplementary electrode 15 formed only on left and right sides of a pixel electrode 13, and a field induction window 51 formed in parallel to the supplementary electrode 15. And, as shown in FIG. 16, the multi-domain liquid crystal display in accordance with a fourteenth preferred embodiment of the present invention includes a supplementary electrode 15 formed only on upper and lower sides of a pixel electrode 13, and a field induction window 51 formed in parallel to the supplementary electrode 15.

In the fifteenth, sixteenth and seventeenth embodiments, the field induction window 51 and the supplementary electrode 15 are formed so that the liquid crystal is oriented in a top to bottom direction or in a left to right direction. That is, as shown in FIG. 17, the multi-domain liquid crystal display in accordance with a fifteenth preferred embodiment of the present invention includes a supplementary electrode 15 formed to surround a pixel electrode 13, a unit pixel, and a field induction window 51 formed in a diagonal direction. And, as shown in FIG. 18, the multi-domain liquid crystal display in accordance with a sixteenth preferred embodiment of the present invention includes a supplementary electrode 15 formed only on left and right sides of a pixel electrode 13, and a field induction window 51 formed in parallel to the supplementary electrode 15. And, as shown in FIG. 19, the multi-domain liquid crystal display in accordance with a seventeenth preferred embodiment of the present invention includes a supplementary electrode 15 formed only on upper and lower sides of a pixel electrode 13, and a field induction window 51 formed in parallel to the supplementary electrode 15.

Figure 20:
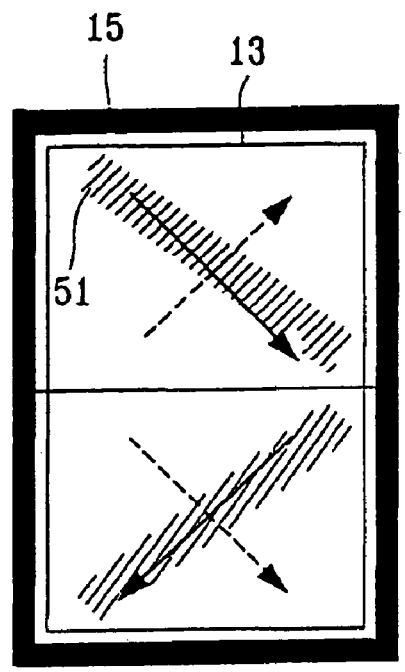
FIG. 20 illustrates a plan view of a multi-domain liquid crystal display in accordance with an eighteenth preferred embodiment of the present invention.
Figure 21:
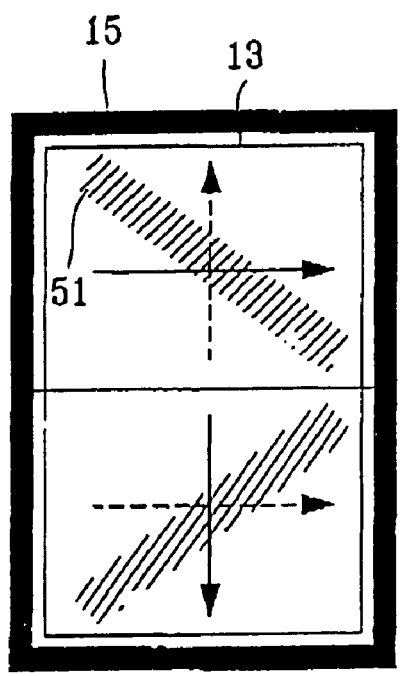
FIG. 21 illustrates a plan view of a multi-domain liquid crystal display in accordance with a nineteenth preferred embodiment of the present invention.
Figure 22:
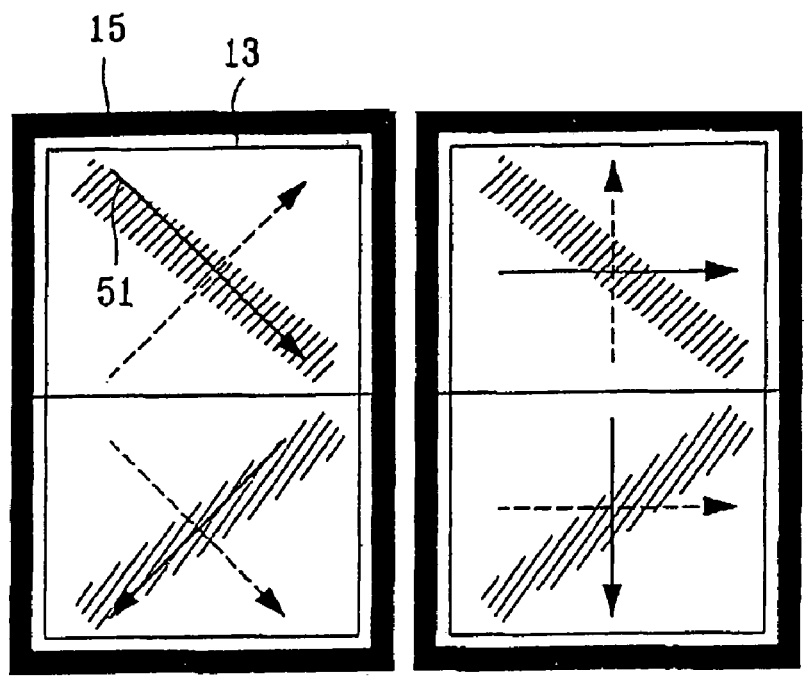
FIG. 22 illustrates a plan view of a multi-domain liquid crystal display in accordance with a twentieth preferred embodiment of the present invention.
Figure 23:
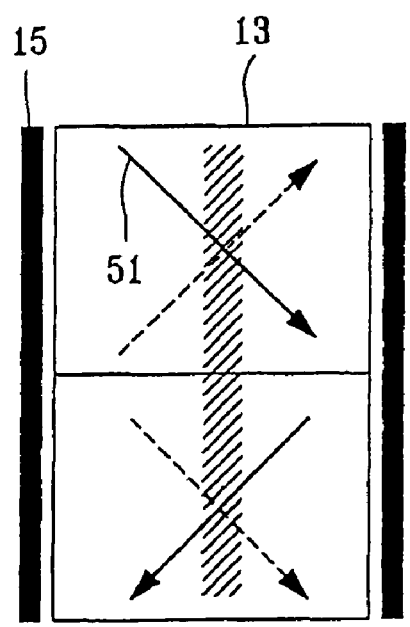
FIG. 23 illustrates a plan view of a multi-domain liquid crystal display in accordance with a twenty first preferred embodiment of the present invention.
Figure 24:
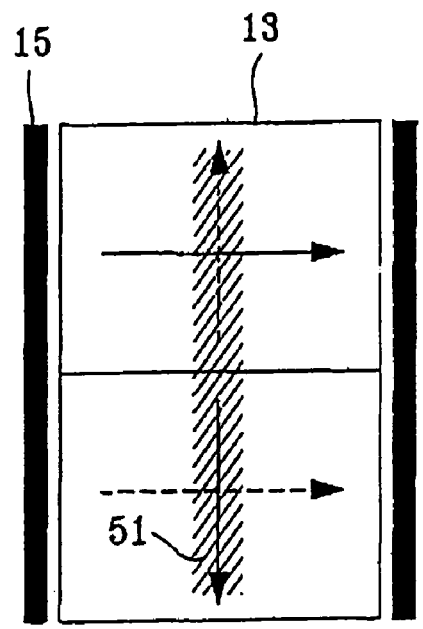
FIG. 24 illustrates a plan view of a multi-domain liquid crystal display in accordance with a twenty second preferred embodiment of the present invention.
Figure 25:
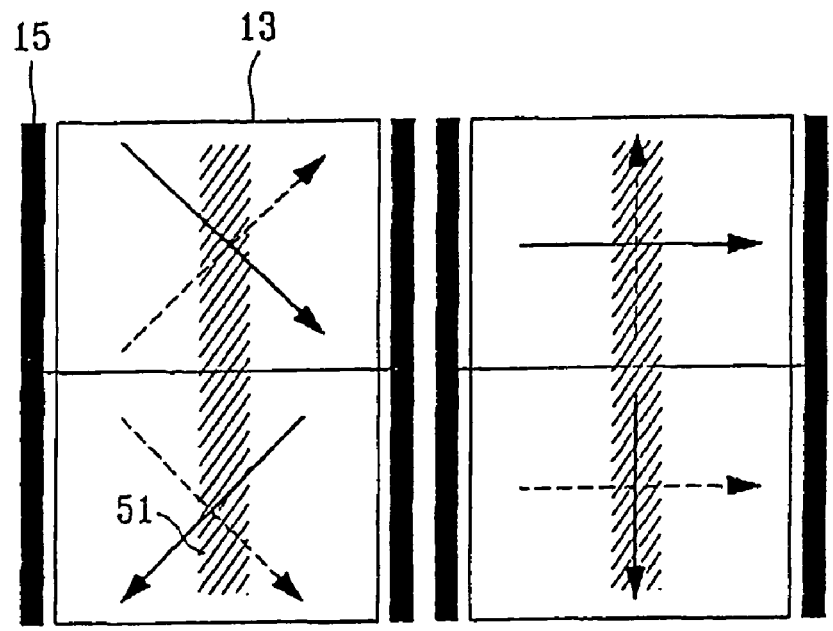
FIG. 25 illustrates a plan view of a multi-domain liquid crystal display in accordance with a twenty third preferred embodiment of the present invention.
Figure 26:
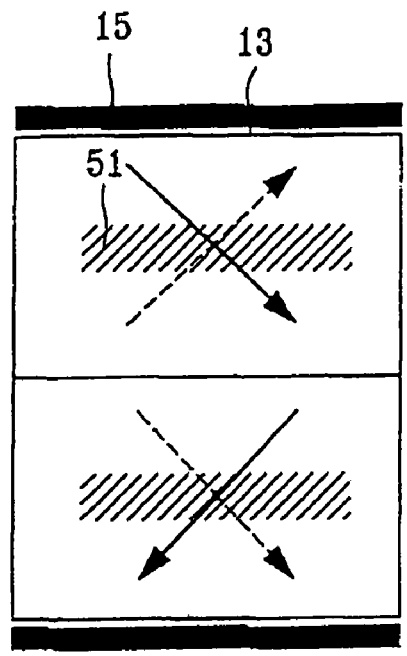
FIG. 26 illustrates a plan view of a multi-domain liquid crystal display in accordance with a twenty fourth preferred embodiment of the present invention.
Figure 27:
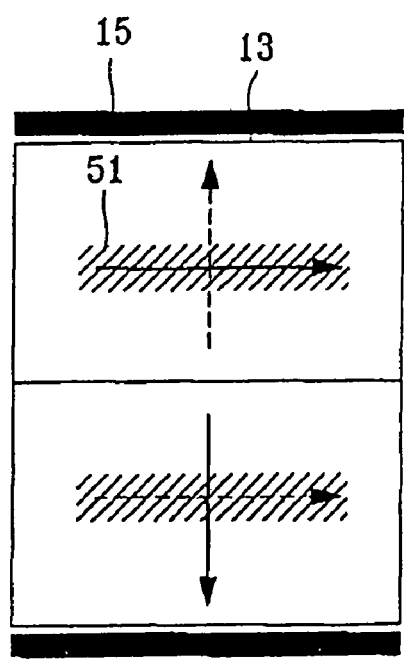
FIG. 27 illustrates a plan view of a multi-domain liquid crystal display in accordance with a twenty fifth preferred embodiment of the present invention.
Figure 28:
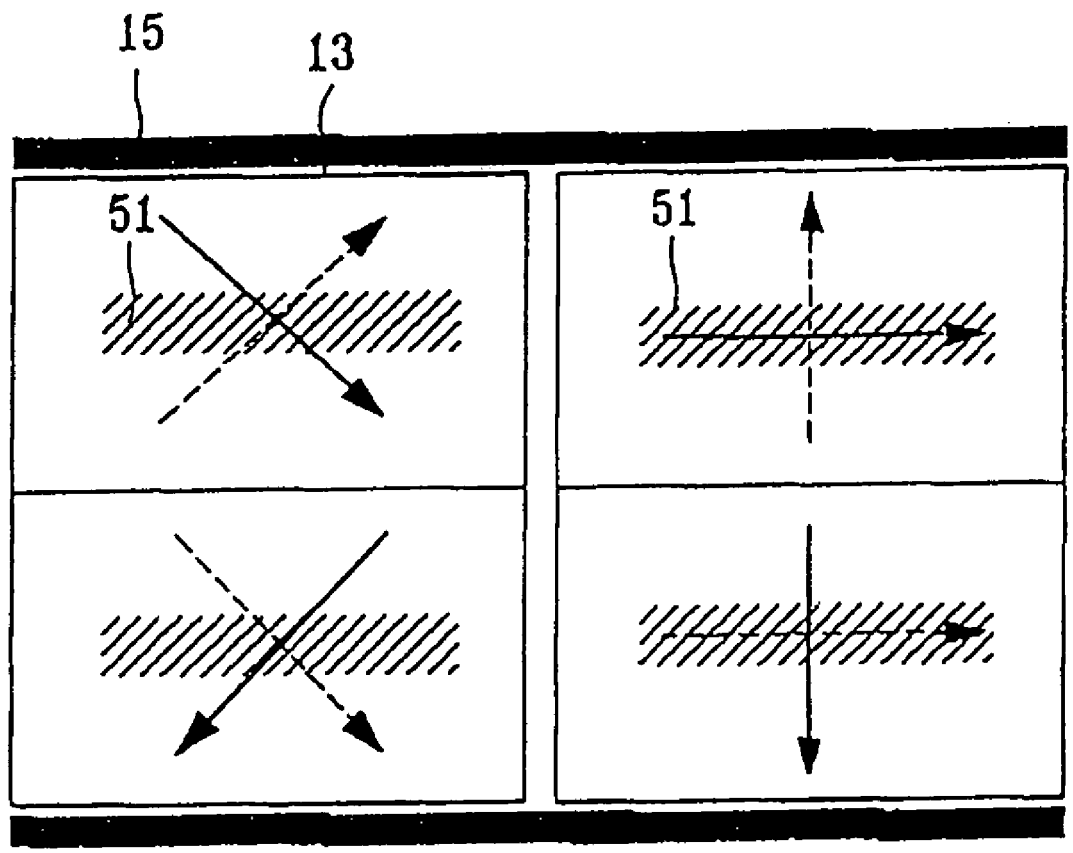
FIG. 28 illustrates a plan view of a multi-domain liquid crystal display in accordance with a twenty sixth preferred embodiment of the present invention.

In the meantime, in another embodiments of the present invention, the field induction windows may be formed in two directions in one unit pixel. FIG. 20 illustrates a plan view of a multi-domain liquid crystal display in accordance with an eighteenth preferred embodiment of the present invention, FIG. 21 illustrates a plan view of a multi-domain liquid crystal display in accordance with a nineteenth preferred embodiment of the present invention, FIG. 22 illustrates a plan view of a multi-domain liquid crystal display in accordance with a twentieth preferred embodiment of the present invention, FIG. 23 illustrates a plan view of a multi-domain liquid crystal display in accordance with a twenty first preferred embodiment of the present invention, FIG. 24 illustrates a plan view of a multi-domain liquid crystal display in accordance with a twenty second preferred embodiment of the present invention, FIG. 25 illustrates a plan view of a multi-domain liquid crystal display in accordance with a twenty third preferred embodiment of the present invention, FIG. 26 illustrates a plan view of a multi-domain liquid crystal display in accordance with a twenty fourth preferred embodiment of the present invention, FIG. 27 illustrates a plan view of a multi-domain liquid crystal display in accordance with a twenty fifth preferred embodiment of the present invention, and FIG. 28 illustrates a plan view of a multi-domain liquid crystal display in accordance with a twenty sixth preferred embodiment of the present invention.

Referring to FIG. 20, the multi-domain liquid crystal display in accordance with an eighteenth preferred embodiment of the present invention includes one pixel unit divided into a first region and a second region, arranged such that the liquid crystal is oriented in a diagonal direction from left to right in the first region, and the liquid crystal is oriented in a diagonal direction from top to bottom in the second region, and the supplementary electrode 15 to surround the pixel electrode 13, to form the field induction windows 51 in diagonal directions different from each other in the first and second regions. And, as shown in FIG. 21, the multi-domain liquid crystal display in accordance with a nineteenth preferred embodiment of the present invention includes one pixel unit divided into a first region and a second region, arranged such that the liquid crystal is oriented in a right to left direction or a bottom to top direction in the first region, and the liquid crystal is oriented in a top to bottom direction or left to right direction in the second region, and the supplementary electrode 15 to surround the pixel electrode 13, to form the field induction windows 51 in diagonal directions different from each other in the first and second regions. And, as shown in FIG. 22, in the multi-domain liquid crystal display in accordance with a twentieth preferred embodiment of the present invention, two adjacent pixels may be oriented in directions different from each other. That is, the multi-domain liquid crystal display in accordance with a twentieth preferred embodiment of the present invention includes two adjacent pixels each divided into two regions of a first region and a second region, arranged such that the liquid crystal is oriented in a diagonal direction from left to right in the first region of the first pixel, the liquid crystal is oriented in a diagonal direction from top to bottom in the second region of the first pixel, the liquid crystal is oriented in a left to right direction or in a bottom to top direction in the first region of the second pixel, and the liquid crystal is oriented in a top to bottom direction or in a left to right direction in the second region of the second pixel, and a supplementary electrode 15 to surround the pixel electrode 13, for forming field induction windows 51 in diagonal directions different from each other in the first and second regions of the first and second pixels. As shown in FIG. 23; the multi-domain liquid crystal display in accordance with a twenty first preferred embodiment of the present invention includes one pixel unit divided into two units of a first region and a second region, arranged such that the liquid crystal is oriented in a diagonal direction from left to right in the first region, and the liquid crystal is oriented in a diagonal direction from top to bottom in the second region, and the supplementary electrode 15 on left and right sides of the pixel electrode 13, to form field induction windows 51 in directions parallel to the supplementary electrode 15 in the first and second regions. And, as shown in FIG. 24, the multi-domain liquid crystal display in accordance with a twenty second preferred embodiment of the present invention includes one pixel unit divided into two units of a first region and a second region, arranged such that the liquid crystal is oriented in a right to left direction or a bottom to top direction in the first region, and the liquid crystal is oriented in a top to bottom direction or left to right direction in the second region, and a supplementary electrode 15 on left and right sides of the pixel electrode 13, to form the field induction windows 51 in directions parallel to the supplementary electrodes in the first and second regions. And, as shown in FIG. 25, in the multi-domain liquid crystal display in accordance with a twenty third preferred embodiment of the present invention, two adjacent pixels may be oriented in directions different from each other. That is, the multi-domain liquid crystal display in accordance with a twenty third preferred embodiment of the present invention includes two adjacent unit pixels each divided into two regions of a first region and a second region, arranged such that the liquid crystal is oriented in a diagonal direction from left to right in the first region of the first pixel, the liquid crystal is oriented in a diagonal direction from top to bottom in the second region of the first pixel, the liquid crystal is oriented in a left to right direction or in a bottom to top direction in the first region of the second pixel, and the liquid crystal is oriented in a top to bottom direction or in a left to right direction in the second region of the second pixel, and a supplementary electrode 15 formed on left and right sides of the pixel electrode 13, for forming field induction windows 51 in directions parallel to the first and second regions of the first and second pixels. As shown in FIG. 26, the multi-domain liquid crystal display in accordance with a twenty fourth preferred embodiment of the present invention includes one pixel unit divided into two units of a first region and a second region, arranged such that the liquid crystal is oriented in a diagonal direction from left to right in the first region, and the liquid crystal is oriented in a diagonal direction from top to bottom in the second region, and the supplementary electrode 15 on a top and bottom sides of the pixel electrode 13, to form field induction windows 51 in directions parallel to the supplementary electrode 15 in the first and second regions. And, as shown in FIG. 27, the multi-domain liquid crystal display in accordance with a twenty fifth preferred embodiment of the present invention includes one pixel unit divided into two units of a first region and a second region, arranged such that the liquid crystal is oriented in a left to right direction or a bottom to top direction in the first region, and the liquid crystal is oriented in a top to bottom direction or left to right direction in the second region, and a supplementary electrode 15 formed on a top and a bottom sides of the pixel electrode 13, to form the field induction windows 51 in directions parallel to the supplementary electrodes 15 in the first and second regions. And, as shown in FIG. 28, in the multi-domain liquid crystal display in accordance with a twenty sixth preferred embodiment of the present invention, two adjacent pixels may be oriented in directions different from each other. That is, the multi-domain liquid crystal display in accordance with a twenty sixth preferred embodiment of the present invention includes two adjacent unit pixels each divided into two regions of a first region and a second region, arranged such that the liquid crystal is oriented in a diagonal direction from left to right in the first region of the first pixel, the liquid crystal is oriented in a diagonal direction from a top to a bottom in the second region of the first pixel, the liquid crystal is oriented in a left to right direction or in a bottom to top direction in the first region of the second pixel, and the liquid crystal is oriented in a top to bottom direction or in a left to right direction in the second region of the second pixel, and a supplementary electrode 15 formed on a top and a bottom sides of the pixel electrode 13, for forming field induction windows 51 in directions parallel to the first and second regions of the first and second pixels.

Figure 29:
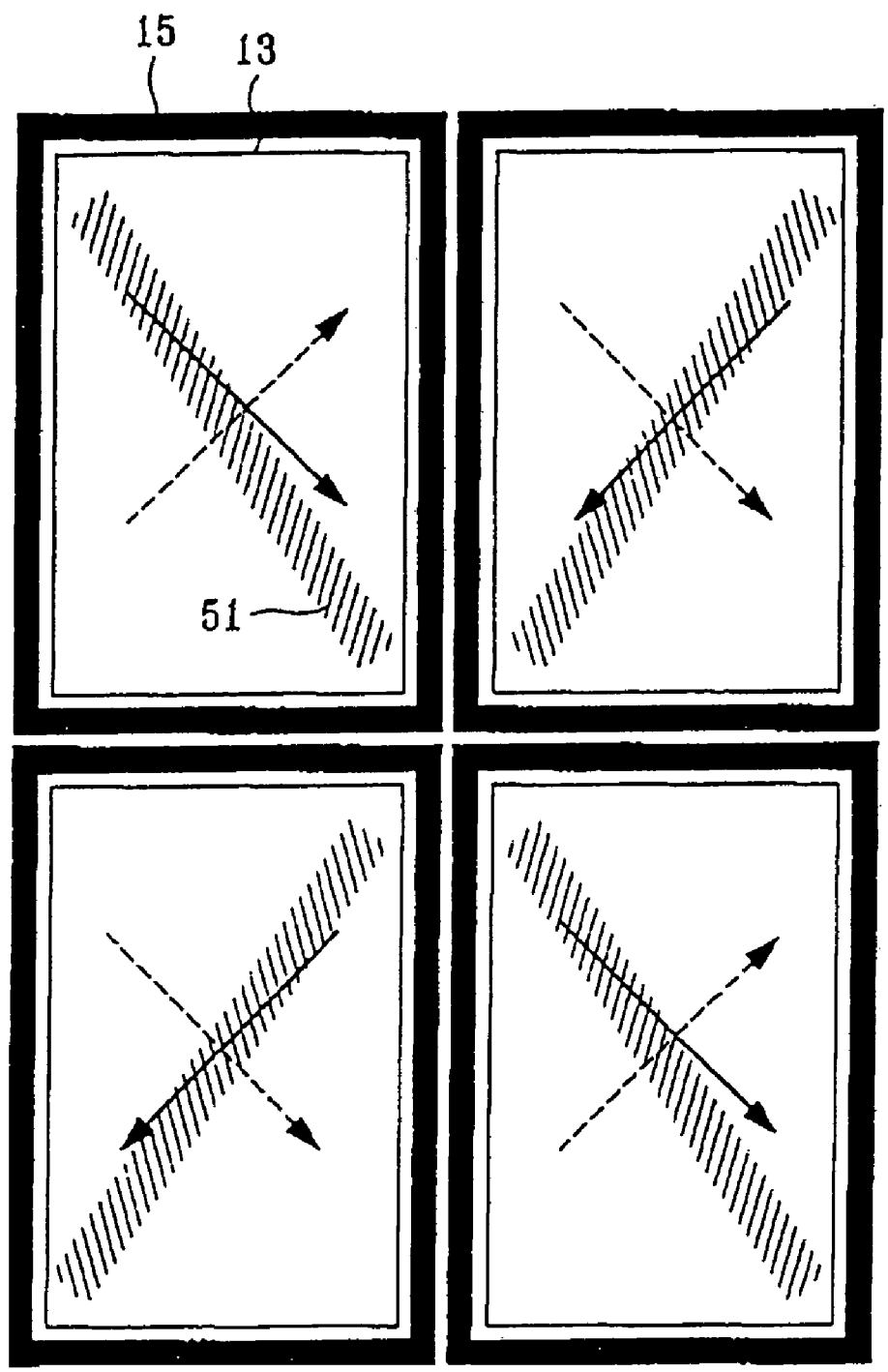
FIG. 29 illustrates a plan view of a multi-domain liquid crystal display in accordance with a twenty seventh preferred embodiment of the present invention.
Figure 32:
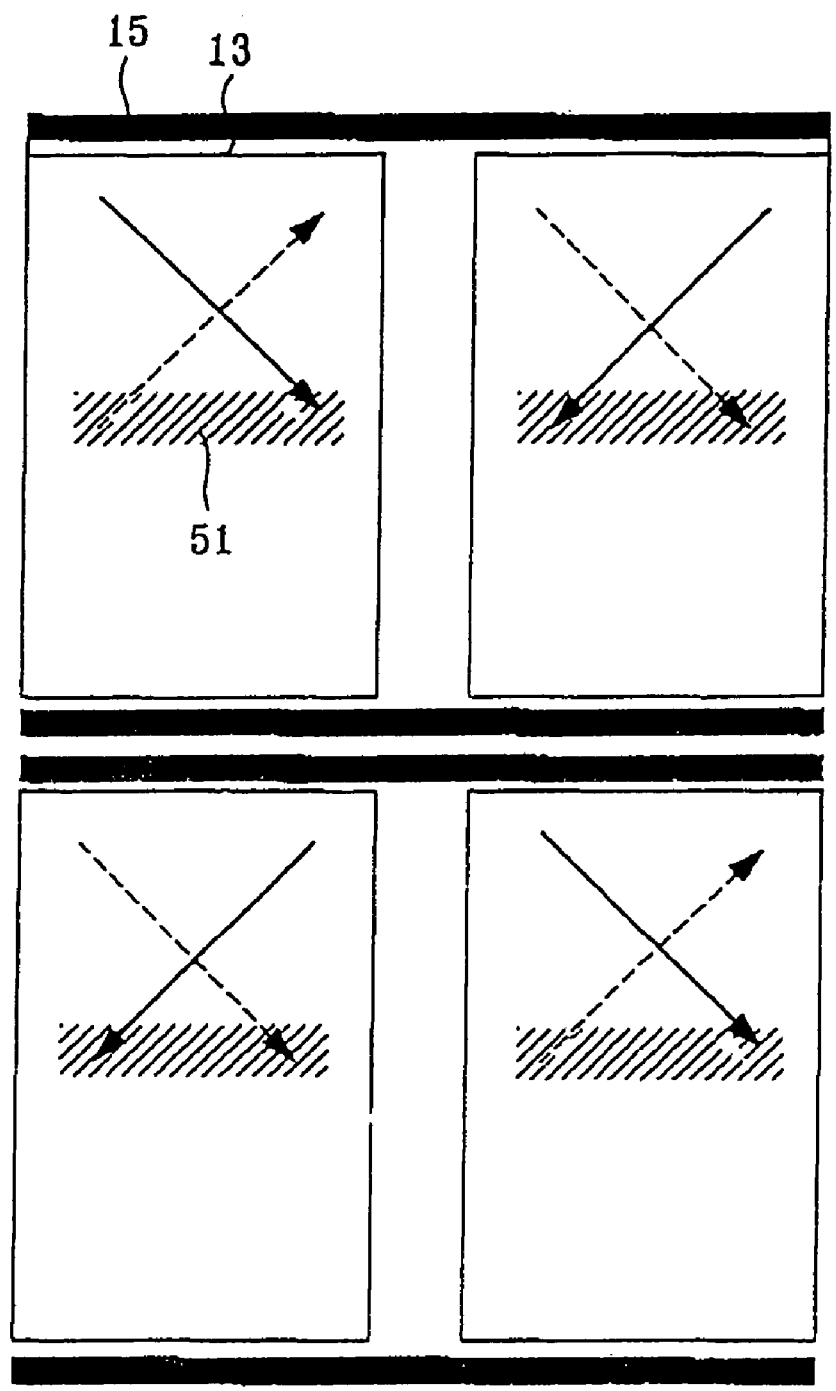
FIG. 32 illustrates a plan view of a multi-domain liquid crystal display in accordance with a thirtieth preferred embodiment of the present invention.
Figure 33:
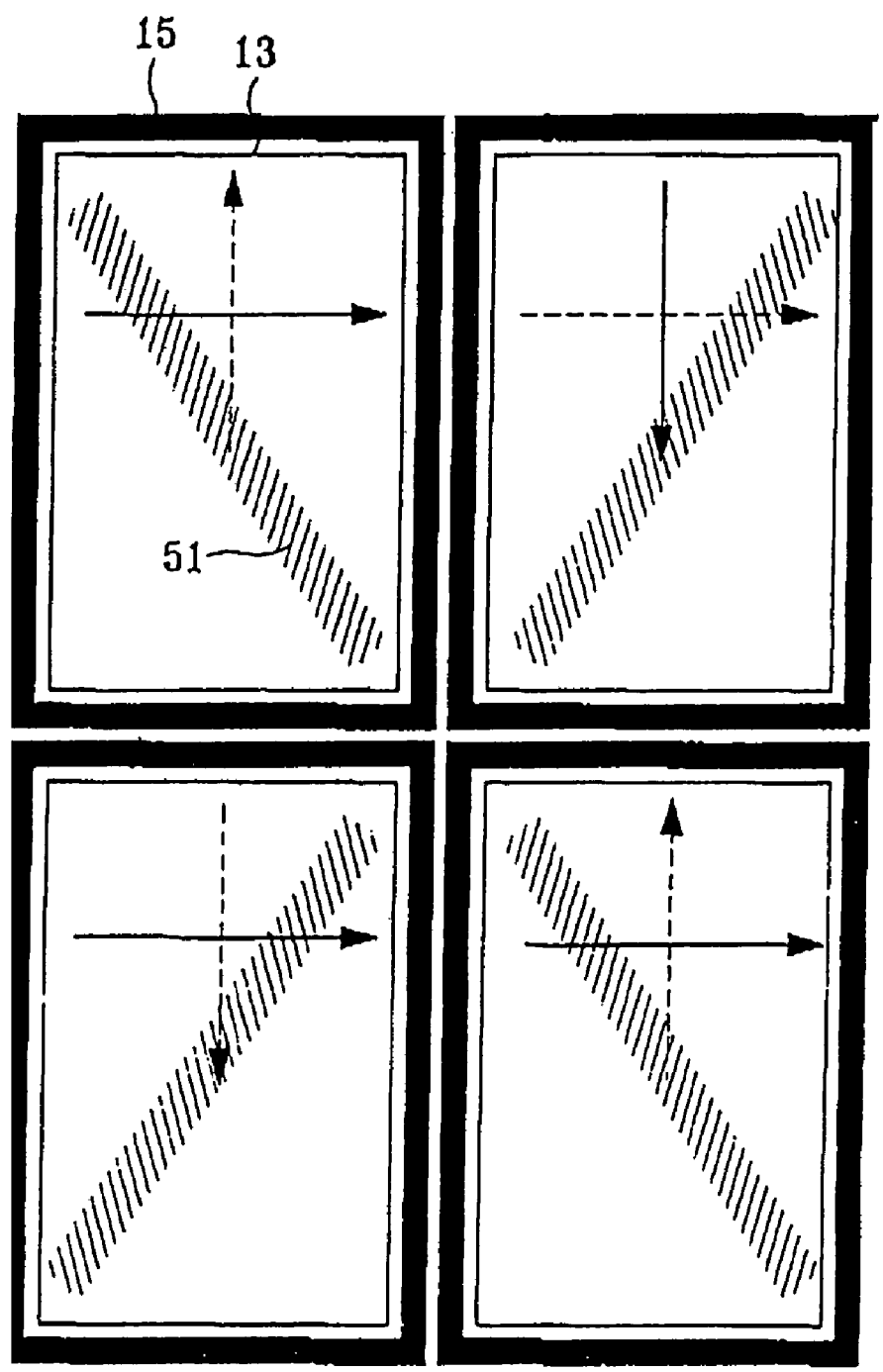
FIG. 33 illustrates a plan view of a multi-domain liquid crystal display in accordance with a thirty first preferred embodiment of the present invention.
Figure 34:
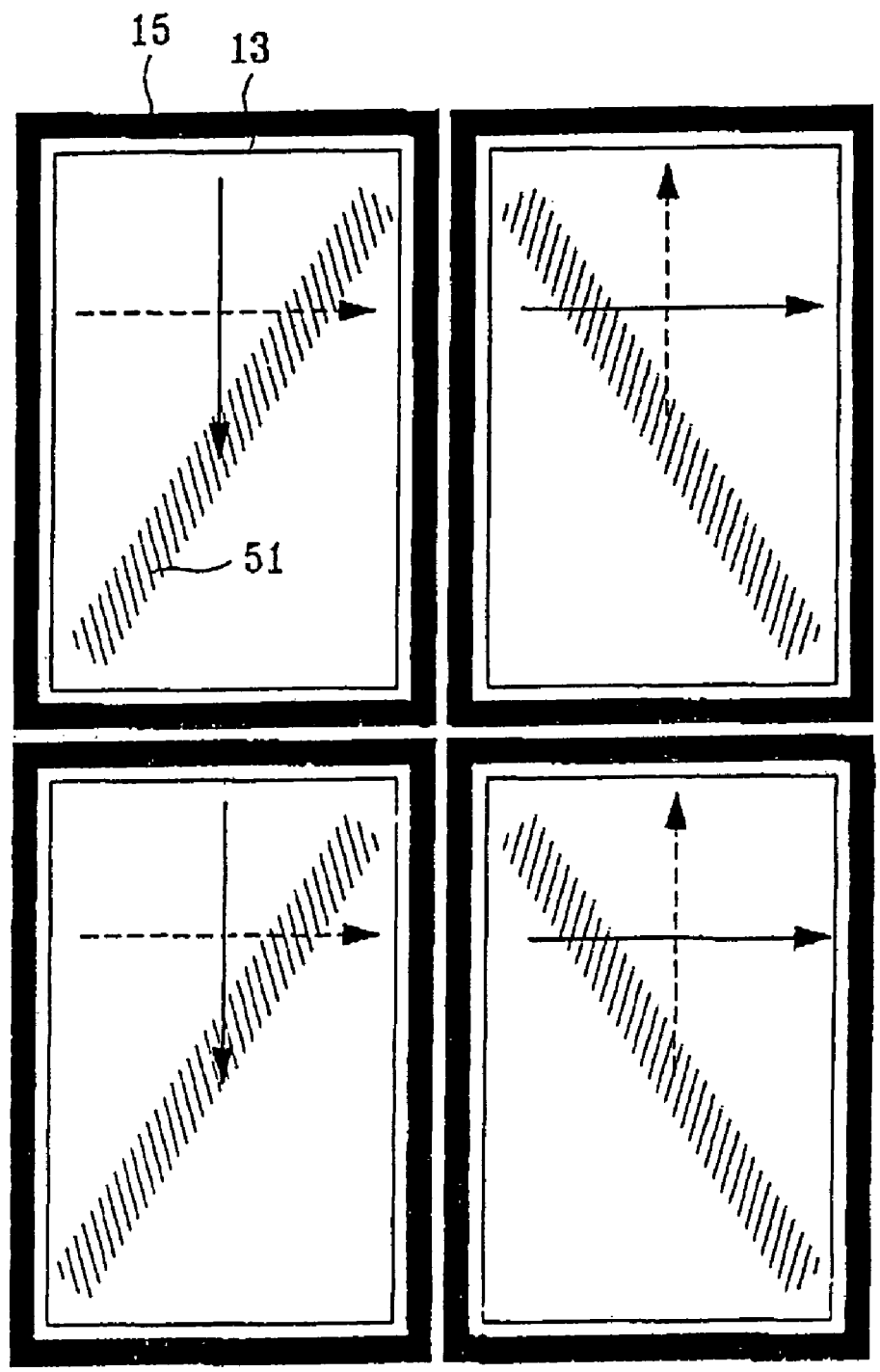
FIG. 34 illustrates a plan view of a multi-domain liquid crystal display in accordance with a thirty second preferred embodiment of the present invention.
Figure 35:
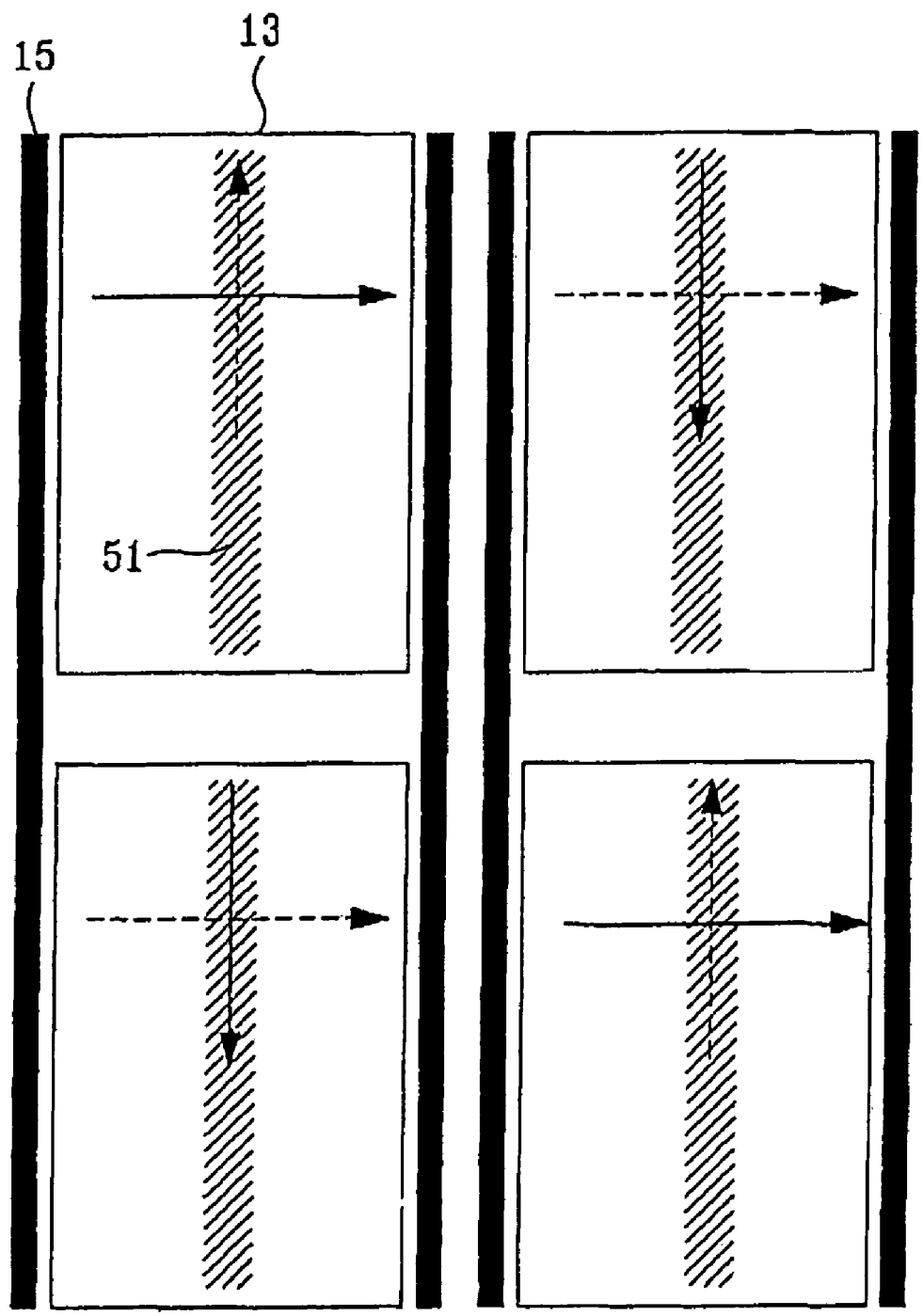
FIG. 35 illustrates a plan view of a multi-domain liquid crystal display in accordance with a thirty third preferred embodiment of the present invention; and, FIG. 36 illustrates a plan view of a multi-domain liquid crystal display in accordance with a third fourth preferred embodiment of the present invention.
Figure 36:
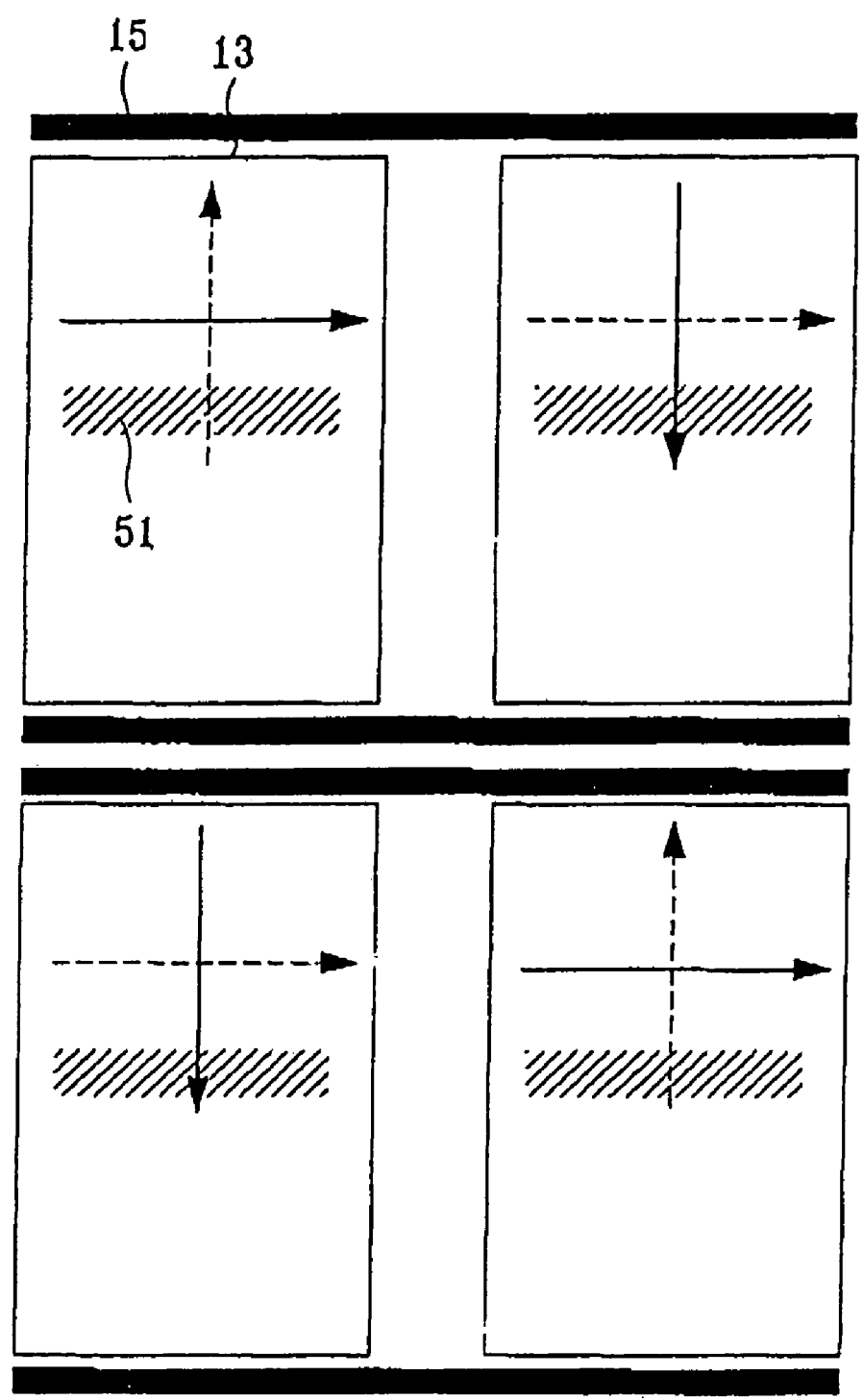

In the meantime, the field induction windows 51 may be arranged in directions different from one another in four adjacent pixels. FIG. 29 illustrates a plan view of a multi-domain liquid crystal display in accordance with a twenty seventh preferred embodiment of the present invention, FIG. 30 illustrates a plan view of a multi-domain liquid crystal display in accordance with a twenty eighth preferred embodiment of the present invention, FIG. 31 illustrates a plan view of a multi-domain liquid crystal display in accordance with a twenty ninth preferred embodiment of the present invention, FIG. 32 illustrates a plan view of a multi-domain liquid crystal display in accordance with a thirtieth preferred embodiment of the present invention, FIG. 33 illustrates a plan view of a multi-domain liquid crystal display in accordance with a thirty first preferred embodiment of the present invention, FIG. 34 illustrates a plan view of a multi-domain liquid crystal display in accordance with a thirty second preferred embodiment of the present invention, FIG. 35 illustrates a plan view of a multi-domain liquid crystal display in accordance with a thirty third preferred embodiment of the present invention, and FIG. 36 illustrates a plan view of a multi-domain liquid crystal display in accordance with a third fourth preferred embodiment of the present invention.

Referring to FIG. 29, the multi-domain liquid crystal display in accordance with a twenty seventh preferred embodiment of the present invention includes four adjacent unit pixels, arranged such that liquid crystal is oriented in a diagonal direction from left to right direction in a first unit pixel and a fourth unit pixel arranged in a diagonal direction, and liquid crystal is oriented in a diagonal direction from top to bottom direction in a second unit pixel and a third unit pixel arranged in a diagonal direction, and a supplementary electrode 15 formed to surround each of the unit pixels, for forming a field induction window 51 in a diagonal direction in each of the unit pixels. The directions of the field induction windows 51 formed in the first and fourth unit pixels and the second and the third unit pixels are the same, respectively.

Figure 30:
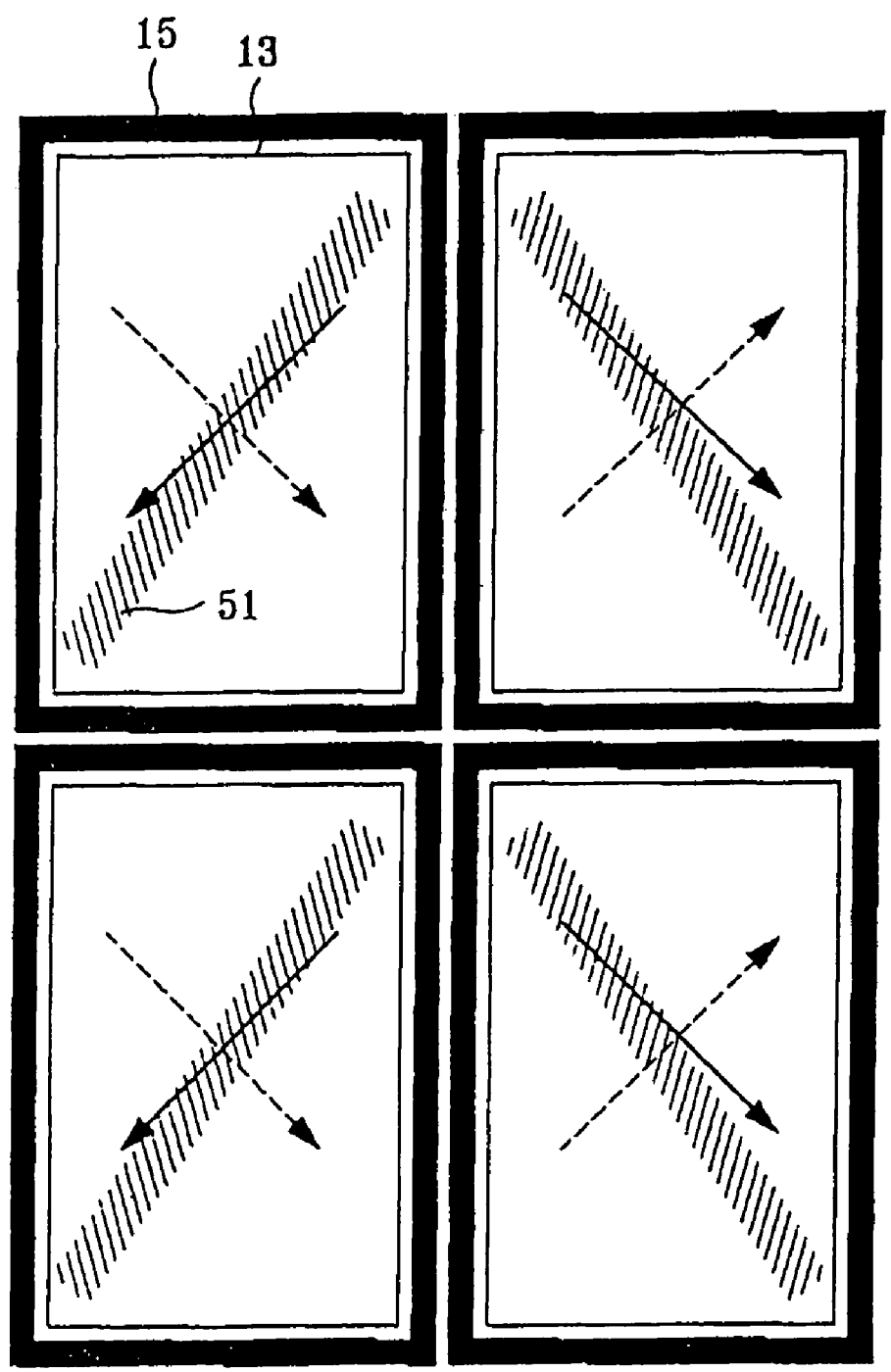
FIG. 30 illustrates a plan view of a multi-domain liquid crystal display in accordance with a twenty eighth preferred embodiment of the present invention.

Referring to FIG. 30, the multi-domain liquid crystal display in accordance with a twenty eighth preferred embodiment of the present invention includes four adjacent unit pixels, arranged such that liquid crystal is oriented in a diagonal direction from top to bottom direction in a first unit pixel and a fourth unit pixel arranged in a diagonal direction, and liquid crystal is oriented in a diagonal direction from left to right direction in a second unit pixel and a third unit pixel arranged in a diagonal direction, and a supplementary electrode 15 formed to surround each of the unit pixels, for forming a field induction window 51 in a diagonal direction in each of the unit pixels. The directions of the field induction windows 51 formed in the first and third unit pixels and the second and the fourth unit pixels are the same, respectively.

Figure 31:
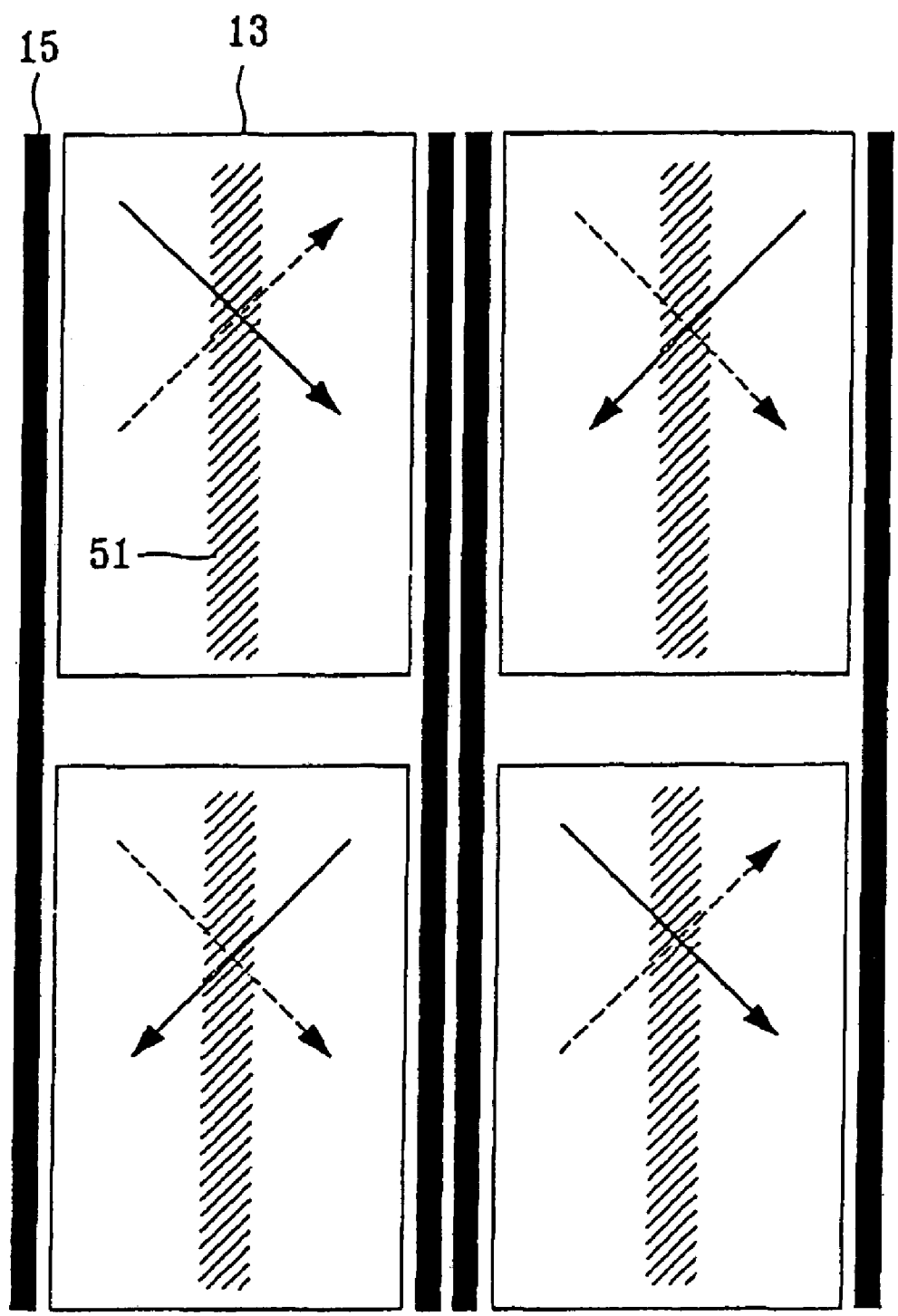
FIG. 31 illustrates a plan view of a multi-domain liquid crystal display in accordance with a twenty ninth preferred embodiment of the present invention.

Referring to FIG. 31, the multi-domain liquid crystal display in accordance with a twenty ninth preferred embodiment of the present invention includes four adjacent unit pixels, arranged such that liquid crystal is oriented in a diagonal direction from left to right direction in a first unit pixel and a fourth unit pixel arranged in a diagonal direction, and liquid crystal is oriented in a diagonal direction from top to bottom direction in a second unit pixel and a third unit pixel arranged in a diagonal direction, and a supplementary electrode 15 formed on left and right sides of the unit pixels, for forming a field induction window 51 in a direction parallel to each of the supplementary electrodes 15.

Referring to FIG. 32, the multi-domain liquid crystal display in accordance with a thirtieth preferred embodiment of the present invention includes four adjacent unit pixels, arranged such that liquid crystal is oriented in a diagonal direction from left to right direction in a first unit pixel and a fourth unit pixel arranged in a diagonal direction, and liquid crystal is oriented in a diagonal direction from top to bottom direction in a second unit pixel and a third unit pixel arranged in a diagonal direction, and a supplementary electrode 15 formed on top and bottom sides of the unit pixels, for forming a field induction window 51 in a direction parallel to each of the supplementary electrodes 15.

Referring to FIG. 33, the multi-domain liquid crystal display in accordance with a thirty first preferred embodiment of the present invention includes four adjacent unit pixels, arranged such that liquid crystal is oriented in left to right direction or bottom to top direction in a first unit pixel and a fourth unit pixel arranged in a diagonal direction, and liquid crystal is oriented in a top to bottom direction or left to right direction in a second unit pixel and a third unit pixel arranged in a diagonal direction, and a supplementary electrode 15 formed to surround each of the unit pixels, for forming a field induction window 51 in a diagonal direction in each of the unit pixels. In this instance, directions of the field induction windows 51 formed in the first and fourth unit pixels and the second and the third unit pixels are the same, respectively.

Referring to FIG. 34, the multi-domain liquid crystal display in accordance with a thirty second preferred embodiment of the present invention includes four adjacent unit pixels, arranged such that liquid crystal is oriented in top to bottom direction or left to right direction in a first unit pixel and a third unit pixel, and liquid crystal is oriented in a bottom to top direction or left to right direction in a second unit pixel and a fourth unit pixel, and a supplementary electrode 15 formed to surround each of the unit pixels, for forming a field induction window 51 in a diagonal direction in each of the unit pixels. In this instance, directions of the field induction windows 51 formed in the first and third unit pixels and the second and the fourth unit pixels are the same, respectively.

Referring to FIG. 35, the multi-domain liquid crystal display in accordance with a thirty third preferred embodiment of the present invention includes four adjacent unit pixels, arranged such that liquid crystal is oriented in a left to right direction or in a bottom to top direction in a first unit pixel and a fourth unit pixel arranged in a diagonal direction, and liquid crystal is oriented in a top to bottom direction or in a top to bottom direction in a second unit pixel and a third unit pixel arranged in a diagonal direction, and a supplementary electrode 15 formed on left and right sides of the unit pixels, for forming a field induction window 51 in a direction parallel to each of the supplementary electrodes 15.

Referring to FIG. 36, the multi-domain liquid crystal display in accordance with a thirty fourth preferred embodiment of the present invention includes four adjacent unit pixels, arranged such that liquid crystal is oriented in a left to right direction or a bottom to top direction in a first unit pixel and a fourth unit pixel, and liquid crystal is oriented in a left to right direction or top to bottom direction in a second unit pixel and a third unit pixel, and a supplementary electrode 15 formed on top and bottom sides of the unit pixels, for forming a field induction window 51 in a direction parallel to each of the supplementary electrodes 15.

As has been explained, the multi-domain liquid crystal display of the present invention has the following advantages.

First, the formation of the pixel electrode and the supplementary electrode around the pixel electrode at the same layer, and the field induction window in the pixel region for inducing field deformation permits to simplify a fabrication process, and maximize a multi-domain effect.

Second, the 'L' form of the thin film transistor improves an aperture.

It will be apparent to those skilled in the art that various modifications and variations can be made in the multi-domain liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
a first substrate and a second substrate;
a liquid crystal layer between the first and second substrates;
a plurality of gate lines and data lines on the first substrate crossing each other to define a plurality of pixel regions along with the second substrate;
a pixel electrode in each of the pixel regions;
a supplementary electrode around each of the pixel electrodes in the same layer as the pixel electrodes;
at least one field induction window in each of the pixel regions; and
a photo orientation film formed at least on one of the first and second substrates,
wherein the field induction windows in at least two of the pixel regions have patterns different from each other.

2. The LCD device according to claim 1, wherein the field induction window is formed in the pixel electrode of the first substrate.

3. The LCD device according to claim 1, wherein the field induction window is formed in a protection film of the first substrate.

4. The LCD device according to claim 1, wherein the field induction window is formed in a gate insulating film of the first substrate.

5. The LCD device according to claim 1, wherein the field induction window is formed in a color filter layer of the second substrate.

6. The LCD device according to claim 1, wherein the field induction window is formed in an overcoat layer of the second substrate.

7. A method of manufacturing a multi-domain liquid crystal display (LCD) device comprising:
providing a first substrate and a second substrate;
providing a liquid crystal layer between the first and second substrates;
forming a plurality of gate lines and data lines on the first substrate crossing each other to define a plurality of pixel regions along with the second substrate;
forming a pixel electrode in each of the pixel regions;
forming a supplementary electrode around each of the pixel electrodes in the same layer as the pixel electrodes;
forming at least one field induction window in each of the pixel regions; and
forming a photo orientation film formed at least on one of the first and second substrates,
wherein the field induction windows in at least two of the pixel regions have patterns different from each other.

8. The method according to claim 7, wherein the field induction window is formed in a color filter layer of the second substrate.

9. The method according to claim 7, wherein the field induction window is formed in an overcoat layer of the second substrate.

* * * * *